United States Patent
Machida

(10) Patent No.: US 9,311,163 B2
(45) Date of Patent: Apr. 12, 2016

(54) CONFIGURATION DATA MANAGEMENT SYSTEM, AND CONFIGURATION DATA MANAGEMENT METHOD

(75) Inventor: Fumio Machida, Tokyo (JP)

(73) Assignee: NEC CORPORATION, Tokyo (JP)

(*) Notice: Subject to any disclaimer, the term of this patent is extended or adjusted under 35 U.S.C. 154(b) by 912 days.

(21) Appl. No.: 13/521,009

(22) PCT Filed: Dec. 17, 2010

(86) PCT No.: PCT/JP2010/072741
§ 371 (c)(1),
(2), (4) Date: Sep. 18, 2012

(87) PCT Pub. No.: WO2011/083673
PCT Pub. Date: Jul. 14, 2011

(65) Prior Publication Data
US 2013/0013732 A1 Jan. 10, 2013

(30) Foreign Application Priority Data
Jan. 8, 2010 (JP) .................................. 2010-003348

(51) Int. Cl.
G06F 15/16 (2006.01)
G06F 9/50 (2006.01)
G06F 9/455 (2006.01)

(52) U.S. Cl.
CPC .......... *G06F 9/5077* (2013.01); *G06F 9/45558* (2013.01); *G06F 2009/45575* (2013.01)

(58) Field of Classification Search
CPC ... H04L 47/70; H04L 41/0806; G06F 9/5077; G06F 9/45558; G06F 11/3409; G06F 9/50; G06F 2009/45575; G06F 9/45533; G06F 11/1484; G06F 2201/875

USPC .................................. 709/217, 224, 223, 220
See application file for complete search history.

(56) References Cited

U.S. PATENT DOCUMENTS

2004/0128670 A1 7/2004 Robinson et al.
2009/0282141 A1 11/2009 Hiramatsu et al.

FOREIGN PATENT DOCUMENTS

| JP | 2006-519423 A | 8/2006 |
| JP | 2007-272263 A | 10/2007 |
| JP | 2008-059599 A | 3/2008 |
| JP | 2008-242766 A | 10/2008 |
| JP | 2009-252204 A | 10/2009 |
| JP | 2009-276835 A | 11/2009 |

OTHER PUBLICATIONS

Summary of VMware vCenter Server and VMware vSphere, pp. 21-25 introduction in English + 44 pages summary in Japanese, ESX 4.0, ESXi 4.0, vCenter Server 4.0, JA-000102-00, http://www.vmware.com/files/jp/pdf/vsp_40_intro_vs_ja.pdf.

*Primary Examiner* — Lan-Dai T Truong
(74) *Attorney, Agent, or Firm* — Sughrue Mion, PLLC

(57) ABSTRACT

In a system in which a physical server and a virtual server exist mixedly, data collected from the physical server and data collected from the virtual server are related and managed. Virtual server identification data which indicates the virtual server uniquely is generated in a network system to which the physical server belongs, to the virtual server which operates in a server virtualization function. The generated virtual server identification data can be referred to from an OS in the virtual server. The configuration data of the virtual server and the configuration data of the physical server are collected including the virtual server identification data. The configuration data of the virtual server and the configuration data of the physical server are related by using the virtual server identification data.

13 Claims, 14 Drawing Sheets

CONFIGURATION DATA MANAGEMENT SYSTEM, AND CONFIGURATION DATA MANAGEMENT METHOD

CROSS REFERENCE TO RELATED APPLICATION

This application is a National Stage of International Application No. PCT/JP010/072741, filed on Dec. 17, 2010, which claims priority from Japanese Patent Application No. 2010-003348, filed Jan. 8, 2010, the contents of all of which are incorporated herein by reference in their entirety.

TECHNICAL FIELD

The present invention relates to a configuration data management system, and particularly, to a configuration data management system in which a physical server and a virtual server that operates on the physical server coexist.

BACKGROUND ART

In operation management of an IT (Information Technology) system, it is important to grasp configuration data of servers, software, devices, networks and so on, which configure the system. By collecting and storing the system configuration data in a configuration data database, the data can be used to determine a cause of a fault, analyze performance bottleneck, and manage availability. The configuration data database needs to hold data of the system components as well as data of dependency between the components.

In recent years, systems including the virtual server as a component have increased, and it is needed to manage configuration data of the system including the virtual server. The virtual server is generated and implemented according to a server virtualization function, and operates on the physical server in which the server virtualization function is installed. The virtual server is generally a VM (Virtual Machine) that functions as a server. A hypervisor and a VMM (Virtual Machine Monitor) are known as examples of the server virtualization function.

A system user and an application (Application software) that runs on the server can use the virtual server without recognizing a difference between the virtual server and the physical server. However, since an entity of the virtual server exists on a certain physical server, there is a dependency between the virtual server and the physical server. Accordingly, the configuration data management system requires a function of specifying the dependency between the virtual server and the physical server.

However, due to properties of the virtual server, the dependency between the virtual server and the physical server cannot be directly specified from the outside. Since the virtual server is configured to behave like the physical server, an OS (Operating System) and the application that runs on the virtual server cannot distinguish the virtual server from the physical server. Thus, the physical server that the virtual server depends on cannot be specified based on data collected from the OS and the application on the virtual server.

On the contrary, it is possible to grasp the virtual server that operates on the physical server on the basis of data of the server virtualization function of the physical server. However, the data of the virtual server, which is obtained through the server virtualization function, is data for specifying the virtual server within the server virtualization function, and the configuration data of the OS and the application, which operate on the virtual server, cannot be referred. Although there is means adapted to collect data by logging in the virtual server, a user account of the OS operating on the virtual server is necessary. Since log-in means are different depending on the OS operating on the virtual server, automated log-in is difficult and further, is undesirable in terms of security. Consequently, it is also difficult to specify the OS and an application program, which operate on the virtual server, on the basis of data collected from the physical server.

In operation management of a system configured of a plurality of physical servers and virtual servers, the server virtualization function is managed in an integrated manner. Thus, a technique such as a server virtualization integrated management function described in Non-Patent Literature 1 is utilized. According to the server virtualization integrated management function described in Non-Patent Literature 1, by recording all of operations executed on the server virtualization function, including start and stop of the virtual server and migration (transfer and conversion of programs and data), it is possible to grasp which virtual server currently operates on which physical server.

However, according to the conventional method such as the server virtualization integrated management function described in Non-Patent Literature 1, all operations related to the virtual machine must be executed through the server virtualization integrated management function. Also, when an operation of the virtual machine is executed without using the server virtualization integrated management function or when another virtual server is added through integration with another system, an operation of newly setting to the server virtualization function is required. Moreover, this operation is troublesome when the executed operation is complicated or many physical servers or virtual servers are added/removed. Furthermore, since the server virtualization integrated management function collect only configuration data of a specific server virtualization function, data of the virtual server generated by the other server virtualization function cannot be managed.

In summary, the conventional methods have following problems.

A first problem is in that, in the configuration data management, the data collected from the virtual server and the data collected from the physical server cannot be related with each other according to the dependency. The reason is in that the data of the physical server cannot be collected from the virtual server and data of the OS and so on in the virtual server cannot be collected from the physical server.

A second problem is in that there is no means for automatically grasping the dependency between the virtual server and the physical server that is not under control of the server virtualization integrated management function. The reason is in that start, stop, and migration of the virtual server that is not under control of the server virtualization integrated management function are not recorded in the server virtualization integrated management function, and therefore, the dependency between the virtual server and the physical server cannot be obtained through the server virtualization integrated management function.

A third problem is in that it is difficult to identify the physical server on which the specific virtual server operates, at the moment after generation, omission, or migration of the virtual server is repeatedly executed without using the server virtualization integrated management function. The reason is in that there is no means for relating the data collected from the virtual server with the data collected from the physical server, and therefore, it is needed to follow the execution history of generation, omission, and migration of the virtual server.

As a related technique, JP 2008-242766A (Patent Literature 1) discloses a process control system. According to the related technique, in the process control system in which the virtual server offering services is configured of the plurality of physical servers, at least one physical server receives node listing data that relates a virtual server with a physical server configuring the virtual server and service listing data that relates the virtual server with the services offered by the virtual server from a console terminal, and generates an allocation table that defines allocation of the services to the physical server. The allocation table as an allocation table which is referred when the physical servers activate a service process is registered in a database server common database that can be referred to from all of the physical servers.

JP 2008-059599A (Patent Literature 2) discloses a virtualized resource allocating method and its execution system. In case of a computer, the resource is a general term for various resources (hardware resources) for satisfactorily operating the computer, such as a memory and a CPU. According to the related technique, in a method of arranging a program in a resource suited to its operating conditions, management data indicating performance and capacity of each resource is collected and managed, configuration management data of each resource is maintained and managed with reference to the management data, the configuration management data containing identification data of the resource used by each task application is referred to read the configuration management data identified based on the identification data from the configuration management data of each resource. Consequently, task application data is generated by relating the configuration management data of a task application with the configuration management data of the searched resource. When the configuration management data of the resource is applicable to a rule for detecting a resource failure in the corresponding task application, data indicating that the resource failure occurs in the task application is outputted.

JP 2007-272263A (Patent Literature 3) discloses a computer managing method, a computer system and a management program. According to the related technique, in the computer managing method in a computer system including a plurality of physical computers, a plurality of virtual computers that operate on the physical computers, and a managing computer connected to the physical computers through a network, designation of a processing performance allocated to each group is received, the processing performances of the physical computers are collected, and the processing performance of the designated group is allocated to the virtual computers that belong to the group, based on the collected processing performances of the physical computers.

JP 2006-519423U (Patent Literature 4) discloses a dynamic service registry for a virtual machine. According to the related technique, in a conventional registry such as a global UDDI (Universal Description, Discovery, and Integration) server, in order to handle a device that is often connected/disconnected to/from a network without any prior notice, for example, a transient device such as a virtual machine that is instantaneously generated and suspended or discarded in a repeated manner, a dynamic resource/service registry is implemented, which reinforces a protocol or a state in a lower level and determine a suitable registry updating, thereby matching the registry state with the active virtual machine at that moment. For example, a virtual machine monitor (VMM) tracks generation, suspension, or omission of the virtual machine (VM), and a resource exposed by the VM. Here, the VMM properly adds or deletes a registry item of the VM according to change of the state of the VM, or offers hook (for example, notification) or other tool based on the state or the protocol such that other related modules and agents (for example, a managing module and registry) can properly behave.

CITATION LIST

Patent Literature 1: JP 2008-242766A
Patent Literature 2: JP 2008-059599A
Patent Literature 3: JP 2007-272263A
Patent Literature 4: JP 2006-519423A
Non-Patent Literature 1: Summary of VMware vCenter Server, VMware vSphere, <http://www.vmware.com/files/jp/pdf/vsp_40_intro_vs_ja.pdf>, p 20 to p 23

SUMMARY OF THE INVENTION

Conventionally, if the location of a virtual server is lost in sight once, when the management log of the virtual server does not exist or when the contents of the management log are not right, it was very difficult to grasp the correspondence relation of the virtual server and the physical server on which the virtual server operates.

One feature of the present invention is to provide a configuration data management system which can relate data collected from a physical server and data collected from a virtual server without depending on management log of the virtual server.

The configuration data management system of the present invention is provided with an identification data generation function and identification data reference function in a server virtualization function of the physical server, and an identification data collection function in an OS function of the virtual server, and a configuration data relating function of the configuration data management server. In the physical server, by the identification data generation function in the server virtualization function, the identification data of the virtual server is generated to indicate the virtual server uniquely in a network system to which the physical server belongs. That is, the identification data of the virtual server is data which does not overlap in the network system to which the physical server belongs. Also, the identification data reference function in the server virtualization function of the physical server is called by the identification data collection function from the OS of the virtual server to collect the identification data of the virtual server. Also, the configuration data relating function of the configuration data management server operates to relate the configuration data of the virtual server and the configuration data of the physical server using the virtual server identification data. It should be noted that it is supposed that names and addresses (a host name and an IP address and so on) of the physical server and the virtual server on the network system are contained in the configuration data of the physical server and the virtual server. Such a configuration is adopted, and data collected from the physical server and data collected from the virtual server are related to each other and managed. Thus, the object of the present invention can be achieved.

A configuration data management system of the present invention includes a first data processing apparatus corresponding to a physical server and a second data processing apparatus corresponding to a configuration data management server. The first data processing apparatus includes: a section for generating virtual server identification data which indicates a virtual server uniquely in a network system to which the first data processing apparatus belongs, to the virtual server which operates by using resources of the first data processing apparatus; a section for transmitting the virtual server identification data to the virtual server; and a section for transmitting the virtual server identification data to the second data processing apparatus. The virtual server includes: a section for receiving said virtual server identification data from said first data processing apparatus; and a section for transmitting said virtual server identification data to said second data processing apparatus. The second data processing apparatus includes: a section for receiving said virtual server identification data from said first data processing apparatus; a section for receiving said virtual server identification data from said virtual server; a section for storing a correspondence relation of said first data processing apparatus and said virtual server based on said virtual server identification data; a section for receiving a search request on said virtual server; and a section for outputting the correspondence relation between said first data processing apparatus and said virtual server in response to said search request. It should be noted that as "means for outputting data which shows a correspondence relation", means of replying data which specifies the physical server related to the virtual server to a search request issuing source, means for replying a correspondence table of the virtual server and the physical server, and so on are thought of. Or, it may be means of transmitting a signal and a command to start an action (e.g. LED blink, sound generation and so on) in the physical server related to the virtual server. But, actually, it is not limited to these examples.

At this time, To communicate with the first data processing apparatus and the virtual server, the second information processing apparatus recognizes the first data processing apparatus and the virtual server which exist on the network by the names and the addresses (host names, IP addresses and so on) of the first data processing apparatus and the virtual server on the network system, separately from the virtual server identification data. At least, the second data processing apparatus can specify a transmission source when receiving data from the first data processing apparatus and the virtual server.

It should be noted that the configuration data management system of present invention may be realized by executing a program for the configuration data management by a computer. The configuration data management program of the present invention can be stored in a storage unit and a storage medium.

The correspondence relation of the virtual server and the physical server on which the virtual server operates can be grasped when the management log of the virtual server does not exist or the contents of the management log are not right.

DESCRIPTION OF EXEMPLIFIED EMBODIMENTS

First Exemplified Embodiment

A first exemplary embodiment of the present invention will be described below with reference to the attached drawings.
(Basic Configuration)

Figure 1:
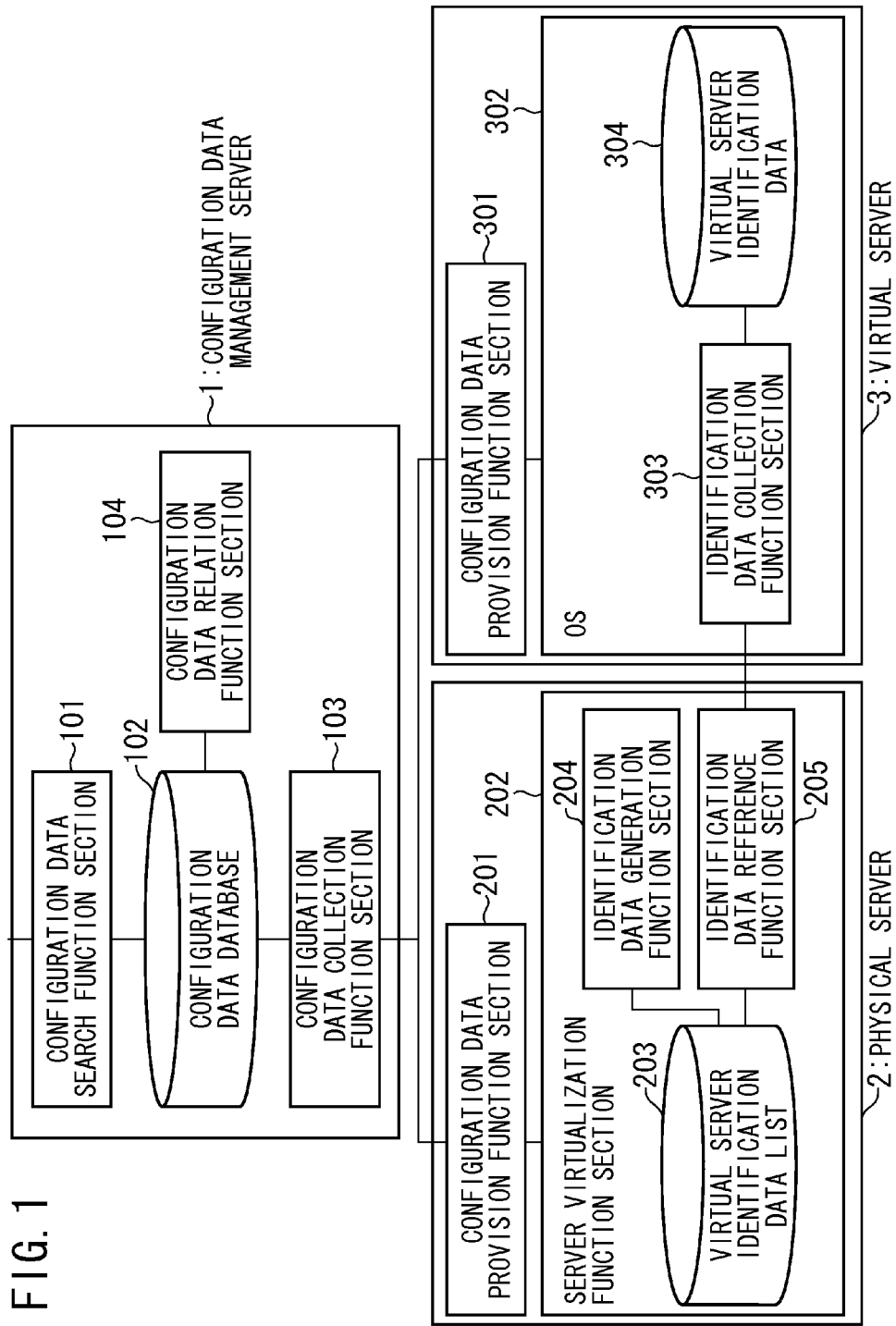
FIG. 1 is a block diagram showing a configuration of a first exemplary embodiment of the present invention.

Referring to FIG. 1, a configuration data management system of the present invention is provided with a configuration data management server 1, a physical server 2, and a virtual server 3.

The configuration data management server 1 manages a server configuration in a network system. One or more physical servers 2 exist in the network system. The virtual server 3 operates on the physical server 2.

The configuration data management server 1 is provided with a configuration data search function section 101, a configuration data database 102, a configuration data collection function section 103, and a configuration data relation function section 104.

The configuration data search function section 101 receives a search request to the configuration data database from a user, an application or so on, inquires data in the configuration data database 102, and returns a result. The configuration data database 102 stores configuration data of a target system, which are collected by the configuration data collection function section 103. The configuration data collection function section 103 communicates with configuration data provision functions of the physical server 2 and virtual server 3 (a configuration data provision function section 201 and a configuration data provision function section 301) through a network, collects the configuration data of the physical server 2 and virtual server 3, and stores the collected data in the configuration data database 102. The configuration data relation function section 104 relates the configuration data of the virtual server 3 with the configuration data of the physical server 2 on the basis of the virtual server identification data. Here, when the virtual server identification data is contained in both of the configuration data of the virtual server 3 and the configuration data of the physical server 2, the configuration data relation function section 104 relates both of them with each other by using the virtual server identification data as a key.

The physical server 2 is provided with the configuration data provision function section 201 and a server virtualization function section 202.

The configuration data provision function section 201 collects the configuration data of the physical server 2 and transmits the configuration data to the configuration data management server 1. The server virtualization function section 202 virtualizes the computer resources of the physical server 2, manages generation, execution, and deletion of the virtual server 3, and generates the virtual server identification data to uniquely identify the virtual server 3 in the network system to which the physical server 2 belongs, with respect to the virtual server 3. That is, the virtual server identification data is data that does not overlap in the network system to which the physical server 2 belongs.

Here, the server virtualization function section 202 is provided with a virtual server identification data list 203, an identification data generation function section 204, and an identification data reference function section 205.

The virtual server identification data list 203 stores a list of the virtual server identification data. The identification data generation function section 204 generates the identification data of each virtual server 3, and stores the generated identification data in the virtual server identification data list 203. Here, the identification data generation function section 204 generates the identification data of the virtual server 3 when the virtual server 3 is generated (upon generation, or immediately after generation), and stores the generated identification data in the virtual server identification data list 203. The identification data generation function section 204 may generate the identification data of the virtual server 3 previously (before generation of the virtual server 3), and store the generated identification data in the virtual server identification data list 203. In this case, the server virtualization function section 202 generates the virtual server 3, with reference to the virtual server identification data list 203. The identification data reference function section 205 provides an interface for providing the virtual server identification data to the virtual server 3. For example, the identification data reference function section 205 transmits the virtual server identification data to the virtual server 3 spontaneously (in a push-type) or when being accessed from the virtual server 3 (in a pull-type).

The virtual server 3 is provided with the configuration data provision function section 301 and an operating system (OS) 302.

The configuration data provision function section 301 collects the configuration data of the virtual server 3 and transmits the configuration data to the configuration data management server 1. The OS 302 manages execution of an application on the virtual server 3.

Here, the OS 302 is provided with an identification data collection function section 303, and a virtual server identification data 304.

The identification data collection function section 303 receives the identification data of the virtual server 3 which is transmitted from the identification data reference function section 205 of the physical server 2. The virtual server identification data 304 stores the virtual server identification data acquired by using an identification data collection function.

It is assumed that the configuration data of the physical server 2 and virtual server 3 are provided with names and addresses of the physical server 2 and virtual server 3 in the network system (host names and IP addresses).

At this time, in order to communicate with the physical server 2 and the virtual server 3, the configuration data management server 1 recognizes the physical server 2 and the virtual server 3 in the network based on the names and addresses of the physical server 2 and the virtual server 3 in the network system. When receiving data from the physical server 2 or the virtual server 3, the configuration data management server 1 can identify a source at least.

(Exemplification of Hardware)

Here, computers such as a PC (personal computer), a work station, a main frame, and a super computer are assumed as examples of the configuration data management server 1 and the physical server 2. The configuration data management server 1 may be one of the physical servers 2. The configuration data management server 1 may be a virtual server that operates on the computer. For example, the configuration data management server 1 may be one of the virtual servers 3. However, in fact, the present invention is not limited to these examples.

Each (each function section) of the configuration data search function section 101, the configuration data collection function section 103, the configuration data relation function section 104, the configuration data provision function section 201, the server virtualization function section 202, the identification data generation function section 204, the identification data reference function section 205, the virtual server 3, the configuration data provision function section 301, the OS 302, and the identification data collection function section 303 is realized by a processor that executes predetermined processing based on a program, and a memory that stores the program and various types of data.

As an example of the above-mentioned processor, a CPU (Central Processing Unit), a microprocessor, a microcontroller, and an IC (Integrated Circuit) having a dedicated function are exemplified.

As an example of the above-mentioned memory, semiconductor memories such as a RAM (Random Access Memory), a ROM (Read Only Memory), an EEPROM (Electrically Erasable and Programmable Read Only Memory) and a flash memory are exemplified.

The above-mentioned processor and memory may be integrated. For example, in recent years, the microcomputer has been integrated onto one chip. Accordingly, it is considered that the 1-chip microcomputer mounted in the computer has the processor and the memory.

When each of the above-mentioned function sections needs communication through the network, a network interface is included. As an example of the network interface, there are exemplified a semiconductor integrated circuit having a substrate (mother board, I/O board), a chip and so on that are applicable to network communication, a network adaptor such as an NIC (Network Interface Card) and similar expansion cards, a communication device such as an antenna, and a communication port such as a connection port (connector). However, in fact, the present invention is not limited to these examples.

As an example of the network, there are exemplified the Internet, a LAN (Local Area Network), a wireless LAN, a WAN (Wide Area Network), a backbone, a cable television (CATV) line, a fixed-line phone network, a mobile phone network, WiMAX (IEEE 802.16a), 3G (3rd Generation), an exclusive line (lease line), IrDA (Infrared Data Association), Bluetooth (registered trade mark), a serial communication line, and a data bus. However, in fact, the present invention is not limited to these examples.

As an example of a hardware configuration that stores each of the configuration data database 102, the virtual server identification data list 203, and the virtual server identification data 304, an auxiliary storage unit such as an HDD (Hard Disk Drive) and an SSD (Solid State Drive), a removable disc such as a DVD (Digital Versatile Disk), and storage medium (media) such as an SD memory card (Secure Digital memory card), in addition to the above-mentioned semiconductor storage unit. The configuration data database 102 is not limited to a storage device built in the computer itself and may be a storage device installed in peripheral equipment (for example, external HDD) and an external server (Web server, file server), or a storage device such as a DAS (Direct Attached Storage), an FC-SAN (Fibre Channel-Storage Area Network), an NAS (Network Attached Storage) and an IP-SAN (IP-Storage Area Network). However, in fact, the present invention is not limited to these examples.

(Exemplification of Virtual Server Identification Data)

The virtual server identification data is identification data that uniquely identifies the virtual server in the network system to which the physical server belongs. The virtual server identification data is sufficient not to overlap in one physical server and between a plurality of physical servers in the network system. Here, an UUID (Universally Unique Identifier) or an equivalent thereof is assumed as an example of the virtual server identification data. As another example, a combination of a virtual MAC address and a virtual machine ID (VMID) (virtual MAC address+virtual machine ID) can be used as the virtual server identification data. However, in fact, the present invention is not limited to these examples.

(Overall Operation)

Next, the overall operation of the present exemplary embodiment will be described in detail with reference to FIG. 1 and flow charts of FIGS. 2 to 8.

(Operation Upon Generation of Virtual Server)

First, an operation upon generation of the virtual server 3 will be described with reference to a flow chart in FIG. 2.

(1) Step S101

First, the server virtualization function section 202 of the physical server 2 receives a virtual server generation request from a user or an application through the network.

(2) Step S102

At this time, the identification data generation function section 204 generates the identification data that can uniquely identify the virtual server 3 in the network system to which the physical server 2 belongs, with respect to the generated virtual server 3. For example, the UUID can be used as the identification data.

(3) Step S103

The identification data generation function section 204 stores the generated identification data in the virtual server identification data list 203. At this time, when the generated identification data has been already in the virtual server identification data list 203, the identification data generation function section 204 updates the stored identification data.

(4) Step S104

The server virtualization function section 202 starts execution of the virtual server 3.

(5) Step S105

In the virtual server 3, a start process of the OS 302 is started.

(6) Step S106

In the start process of the OS 302, the identification data collection function section 303 receives the identification data of the virtual server 3 from the identification data reference function section 205 of the physical server 2 on which the virtual server 3 operates. The identification data collection function section 303 may operate as one function of the OS 302. It should be noted that the operation of the OS 302 is actually executed by a processor that operates the OS 302.

(7) Step S107

The identification data collection function section 303 stores the acquired identification data in a storage area of the virtual server 3. Here, the identification data collection function section 303 holds the acquired identification data as the virtual server identification data 304 in the OS 302. That is, at the start of the OS 302, the virtual server 3 acquires and holds the virtual server identification data 304 from the physical server 2.

(Operation of Collecting Configuration Data)

Next, with reference to flow charts in FIG. 3 and FIG. 4, an operation of collecting the configuration data will be described.

(Operation of Configuration Data Collection Processing of Server Having Server Virtualization Function)

Figure 3:
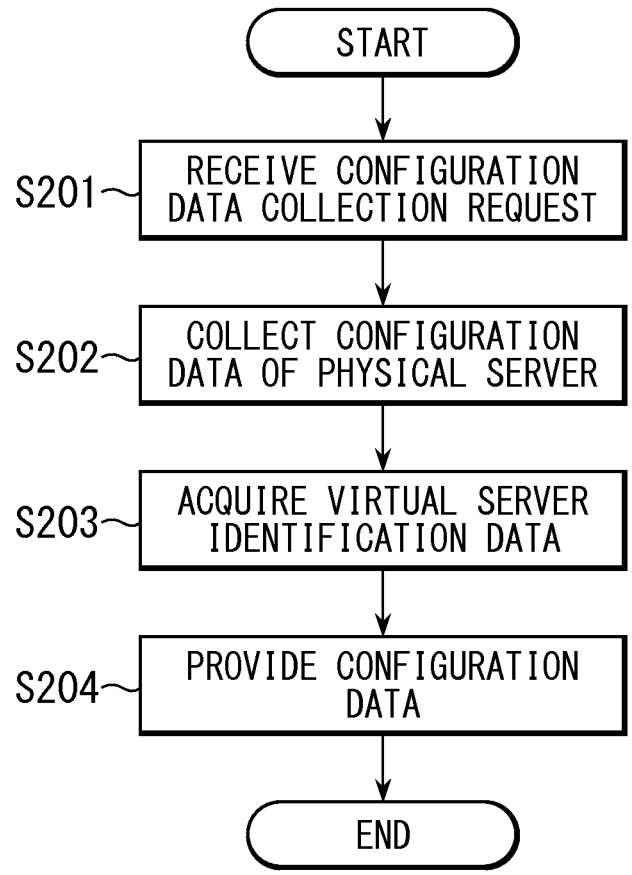
FIG. 3 is a flow chart showing an operation of collecting configuration data from a server having a server virtualization function in the first exemplary embodiment.

A flow chart in FIG. 3 shows an operation of configuration data collection processing by a server having a server virtualization function. It is apparent that the server having the server virtualization function is the physical server 2.

(1) Step S201

The configuration data provision function section 201 receives a data collection request from the configuration data management server 1.

(2) Step S202

The configuration data provision function section 201 collects the configuration data of the physical server 2.

(3) Step S203

The configuration data provision function section 201 acquires the virtual server identification data list 203. The virtual server identification data list 203 is a collection of the identification data (virtual server identification data 304) of each virtual server 3 operating on the physical server 2.

(4) Step S204

The configuration data provision function section 201 transmits the configuration data obtained by relating the original configuration data of the physical server 2 with the virtual server identification data list 203 to the configuration data management server 1 as the configuration data of the physical server 2. That is, the configuration data provision function section 201 adds/relates the virtual server identification data that is generated and held by the physical server 2 to/with the original configuration data of the physical server 2, and transmits the integrated data of the original configuration data and the virtual server identification data to the configuration data management server 1 as the proper configuration data of the physical server 2. Thus, the configuration data of the physical server 2 directly and indirectly contains the virtual server identification data.

(Operation of Configuration Data Collection Processing by Server Having No Server Virtualization Function)

Figure 4:
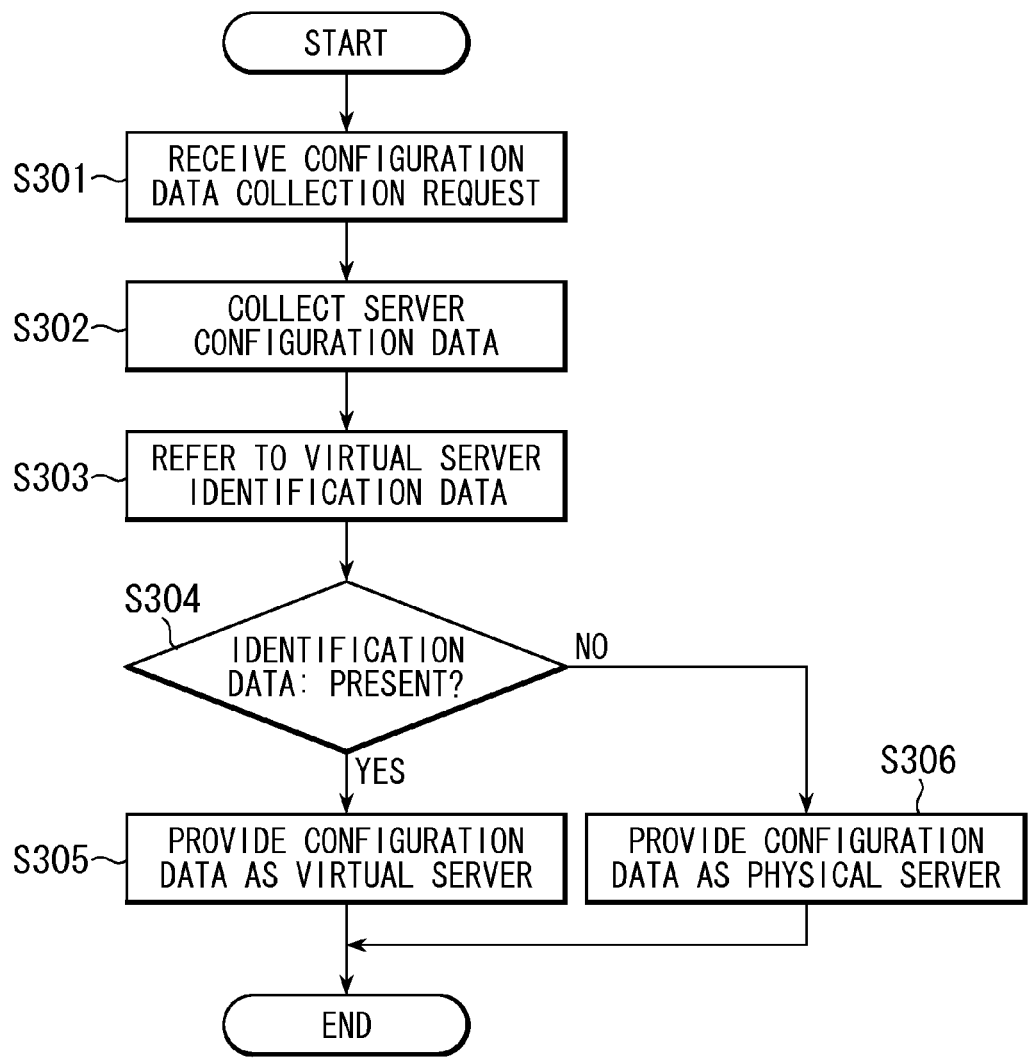
FIG. 4 is a flow chart showing an operation of collecting the configuration data from a server having no server virtualization function in the first exemplary embodiment.

A flow chart in FIG. 4 shows an operation of the configuration data collection processing by a server having no server virtualization function. It is unclear which of the physical server 2 and the virtual server 3 does not have the virtualization function.

(1) Step S301

The configuration data provision function section 201 or the configuration data provision function section 301 receives the data collection request from the configuration data management server 1. For example, when the server is the physical server 2, the configuration data provision function section 201 receives the data collection request from the configuration data management server 1. When the server is the virtual server 3, the configuration data provision function section 301 receives the data collection request from the configuration data management server 1.

(2) Step S302

In response to the data collection request from the configuration data management server 1, the configuration data provision function section 201 or the configuration data provision function section 301 starts collection of the configuration data of the server. For example, when the server is the physical server 2, the configuration data provision function section 201 starts collection of the configuration data of the physical server 2 in response to the data collection request from the configuration data management server 1. When the server is the virtual server 3, the configuration data provision function section 301 starts collection of the configuration data of the virtual server 3 in response to the data collection request from the configuration data management server 1.

(3) Step S303

When the server is the virtual server 3, the configuration data provision function section 301 also tries to refer to (or acquire) the virtual server identification data 304. When the server is the physical server 2, this processing is not executed.

(4) Step S304

At this time, the configuration data provision function section 301 checks whether or not the virtual server identification data 304 exists in the virtual server 3. For example, the configuration data provision function section 301 checks whether or not the virtual server identification data 304 held in the OS 302 can be referred to (or acquired). Here, when the virtual server identification data 304 can be referred to (or acquired), the configuration data provision function section 301 determines that the virtual server identification data 304 exists. When the server is the physical server 2, since the configuration data provision function section 201 cannot refer to (or acquire) the virtual server identification data 304, it is determined that the virtual server identification data 304 does not exist.

(5) Step S305

When the virtual server identification data 304 exists (Yes at Step S304), since the server is the virtual server 3, the configuration data provision function section 301 transmits configuration data obtained by relating the original configuration data of the virtual server 3 with the virtual server identification data 304, to the configuration data management server 1 as the configuration data of the virtual server 3. That is, the configuration data provision function section 301 adds/relates the virtual server identification data that is acquired from the physical server 2 and held by the virtual server 3 to/with the original configuration data of the virtual server 3, and transmits the added/related data of the original configuration data and the virtual server identification data to the configuration data management server 1 as proper configuration data of the virtual server 3. Thus, the configuration data of the virtual server 3 directly and indirectly contains the virtual server identification data. Actually, the configuration data provision function section 301 may transmit only the virtual server identification data acquired from the physical server 2 to the configuration data management server 1, instead of transmitting the configuration data of the virtual server 3.

(6) Step S306

When the virtual server identification data 304 does not exists (No at Step S304), since the server is the physical server 2 having no server virtualization function, the configuration data provision function section 201 transmits the collected configuration data of the physical server 2 to the configuration data management server 1.

As described above, the configuration data of the physical server 2 and the virtual server 3 are provided with the "names and addresses of the physical server 2 and virtual server 3 in the network system".

(Operation of Configuration Data Management Server)

Next, with reference to flow charts in FIGS. 5 to 8, an operation of the configuration data management server 1 will be described.

(Operation of Configuration Data Collection Processing)

Figure 5:
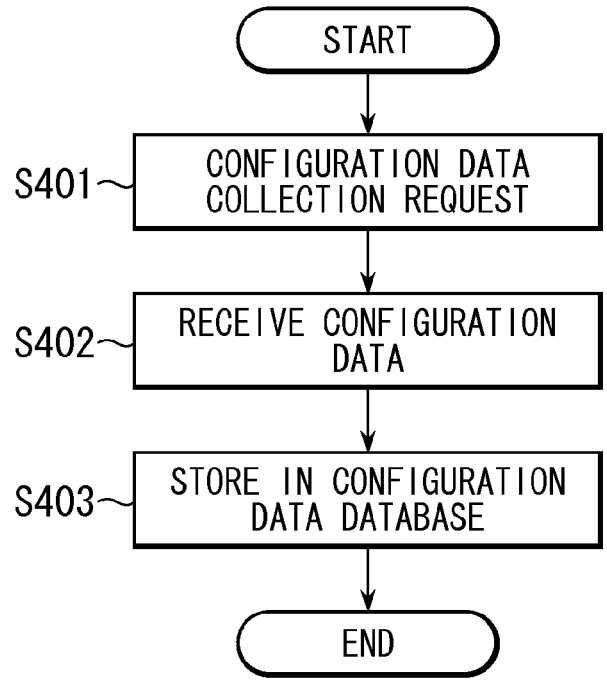
FIG. 5 is a flow chart showing an operation of collecting the configuration data in a configuration data management server in the first exemplary embodiment.

A flow chart in FIG. 5 shows an operation of executing the configuration data collection processing.

(1) Step S401

The configuration data collection function section 103 receives a request to collect the configuration data from the user or the application through the network.

(2) Step S402

The configuration data collection function section 103 communicates with the configuration data provision function sections 201 and 301 of the managed servers (physical server 2, virtual server 3) through the network, and receives the configuration data of each server. That is, the configuration data collection function section 103 collects the configuration data of the physical server 2 or the virtual server 3.

(3) Step S403

The configuration data collection function section 103 stores the collected configuration data in the configuration data database 102 for every server. At this time, the configuration data relation function section 104 relates the configuration data that contain the same virtual server identification data with each other. Here, when both of the configuration data of the virtual server 3 and the configuration data of the physical server 2 contain the virtual server identification data, the configuration data relation function section 104 relates both of them with each other by using the virtual server identification data as a key. The configuration data relation function section 104 may relate both of the collected configuration data with each other at a time when the configuration data collection function section 103 collects the configuration data, or may periodically access the configuration data database 102 and relate both of the stored configuration data with each other.

(Operation of Configuration Data Search Processing)

Figure 6:
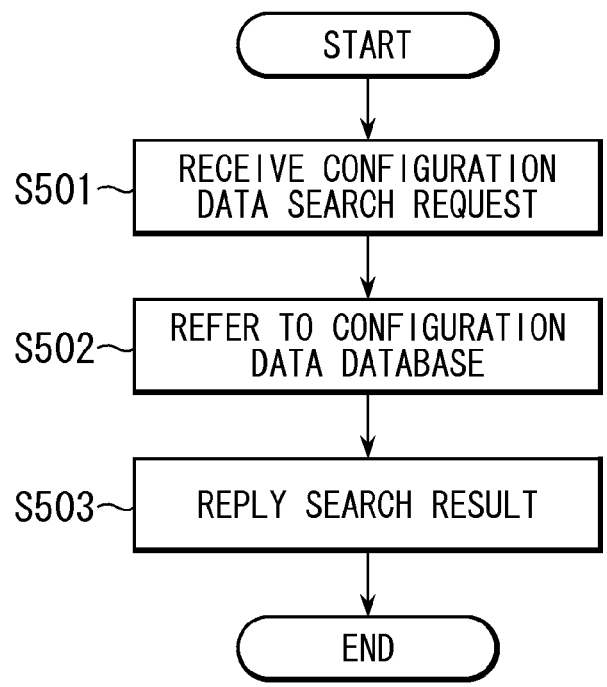
FIG. 6 is a flow chart showing an operation of searching the configuration data in the configuration data management server in the first exemplary embodiment.

A flow chart in FIG. 6 shows an operation of configuration data search processing.

(1) Step S501

The configuration data search function section 101 receives a configuration data search request from the user or the application directly or through the network. For example, the configuration data search function section 101 receives an input of the search request based on an operation of a console of the configuration data management server 1 by the user or the operation of the application on the configuration data management server 1. Alternatively, the configuration data search function section 101 receives an input of the search request from a terminal connected to the configuration data management server 1 through the network.

(2) Step S502

The configuration data search function section 101 refers to the configuration data database 102.

(3) Step S503

The configuration data search function section 101 acquires the requested configuration data from the configuration data database 102 and returns a result (requested configuration data).

Here, although an operation of receiving the configuration data search request for a certain server and returning the configuration data of the server is described, when the server is the virtual server, or when the server is the physical server and the virtual server operates on the physical server, data indicating the correspondence relation between the virtual server and the physical server (indicating the correspondence) may be outputted. As a method of outputting the data indicating the correspondence relation, data specifying the virtual server or the physical server may be returned to a unit which has issued the search request, or a correspondence table between the virtual server and the physical server may be returned. When the server is the virtual server, a signal or command to start any action (for example, LED flashing, voice production and so on) may be sent to the physical server related with the virtual server. However, in fact, the present invention is not limited to these examples.

(Operation of Identifying Configuration Data of Physical Server)

Figure 7:
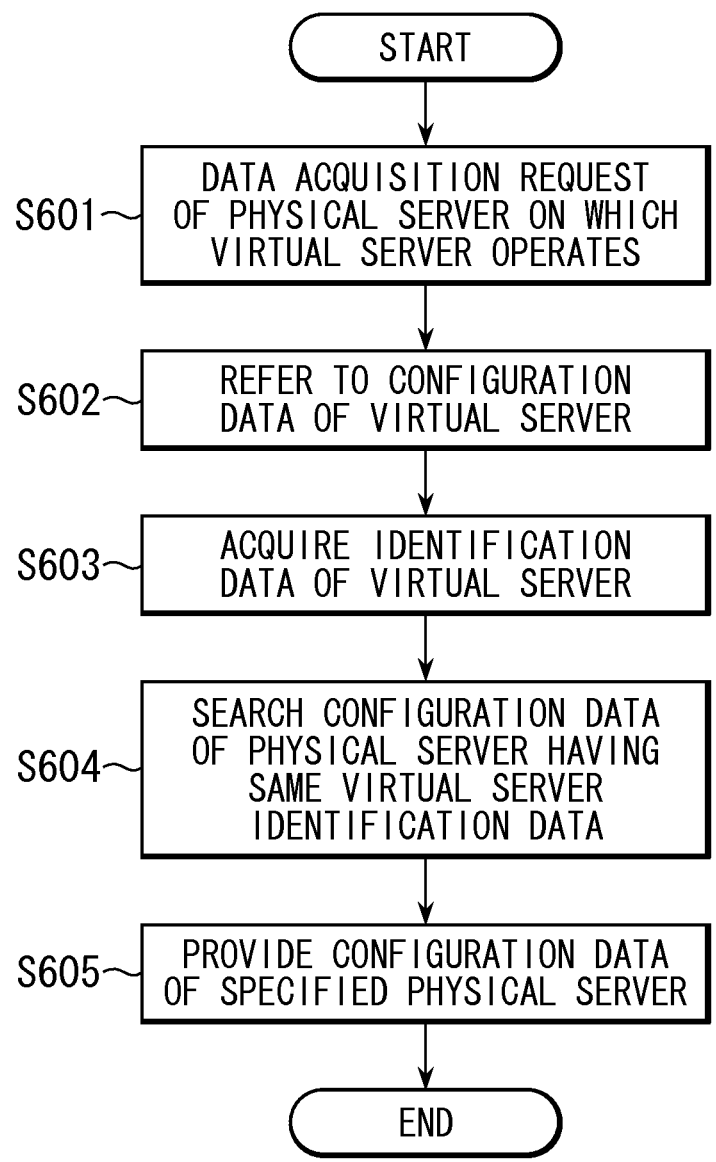
FIG. 7 is a flow chart showing an operation of identifying a physical serve on which a specific virtual server operates in the first exemplary embodiment.

A flow chart in FIG. 7 shows an operation of identifying the configuration data of the physical server 2 on which the virtual server 3 operates. The configuration data search function section 101 may perform this operation at the search, or may perform the operation in the background and store a result (configuration data of the physical server 2) in the configuration data database 102.

(1) Step S601

The configuration data search function section 101 receives an acquisition request to acquire the configuration data of the physical server 2 on which the virtual server 3 operates from the user or the application through the network.

(2) Step S602

Upon the reception of the acquisition request to acquire the configuration data of the physical server 2 on which the virtual server 3 operates, the configuration data search function section 101 first searches the configuration data database 102 for the configuration data of the virtual server 3.

(3) Step S603

The configuration data search function section 101 acquires the virtual server identification data 304 from the configuration data of the virtual server 3. For example, the configuration data search function section 101 acquires the virtual server identification data 304 related with the configuration data of the virtual server 3.

(4) Step S604

The configuration data search function section 101 searches the configuration data of the physical server 2 on the basis of the virtual server identification data 304. That is, by using the virtual server identification data 304 as a key, the configuration data search function section 101 acquires the configuration data of the physical server 2 from the configuration data database 102.

(5) Step S605

The configuration data search function section 101 provides the configuration data of the physical server 2, which is identified as a result of the search, to the requesting user or application.

(Operation of Acquiring Configuration Data of Virtual Server)

Figure 8:
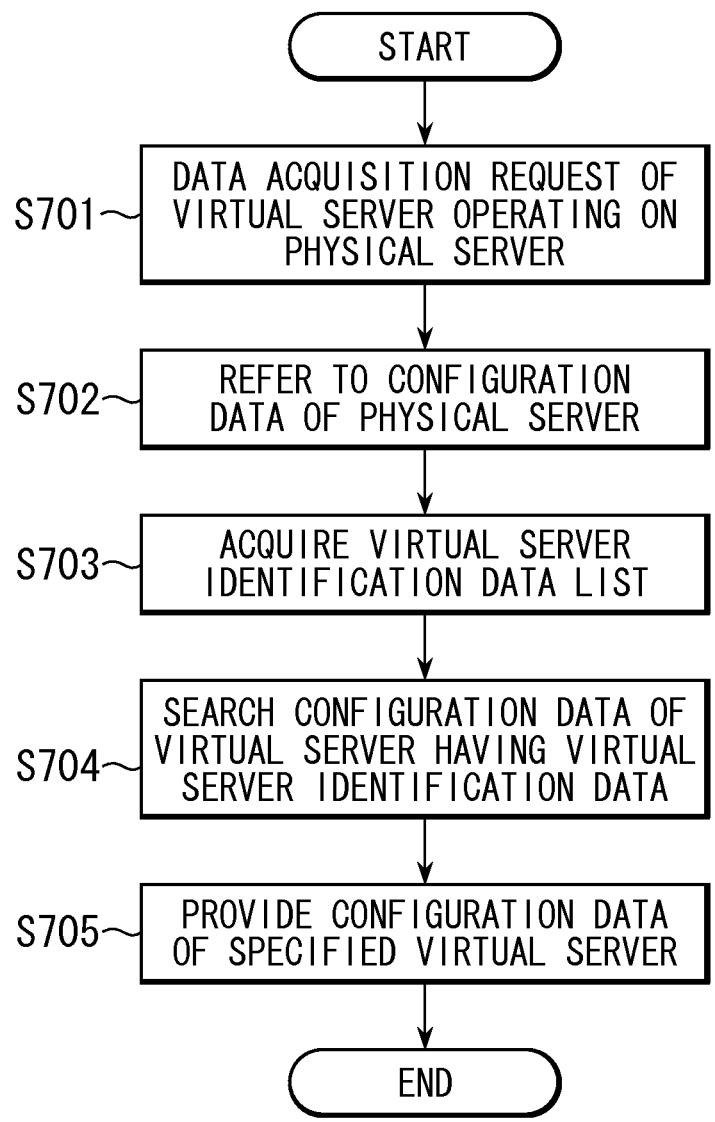
FIG. 8 is a flow chart showing an operation of with reference to the configuration data of the virtual server that operates on a specific physical server in the first exemplary embodiment.

A flow chart in FIG. 8 shows an operation of acquiring the configuration data of the virtual server 3 that operates on the physical server 2. The configuration data search function section 101 may perform the operation at the search, or may perform the operation in the background and store a result (the configuration data of the virtual server 3) in the configuration data database 102.

(1) Step S701

The configuration data search function section 101 receives an acquisition request to acquire the configuration data of the virtual server 3 that operates on the physical server 2 from the user or the application through the network.

(2) Step S702

Upon the reception of the acquisition request to acquire the configuration data of the virtual server 3 that operates on the physical server 2, the configuration data search function section 101 first searches the configuration data database 102 for the configuration data of the physical server 2.

(3) Step S703

The configuration data search function section 101 acquires the virtual server identification data list 203 from the configuration data database 102.

(4) Step S704

The configuration data search function section 101 searches the configuration data of the virtual server 3 having the virtual server identification data 304 on the basis of the virtual server identification data list 203.

(5) Step S705

The configuration data search function section 101 provides the configuration data of the virtual server 3, which is identified as a result of the search, to the requesting user or the application.

(Detail of Configuration Data Relation Processing)

The configuration data relation processing has two processing modes: "a mode of executing the processing as needed" and "a mode of previously executing the relation processing".

(1) Mode of Executing Processing as Needed

Upon the reception of a specific search (acquisition) request, the configuration data relation function section 104 executes the relation processing. The search request itself is received by the configuration data search function section 101. The configuration data search function section 101 analyzes a requested search condition and determines whether or not the search request requires a correspondence relation between the physical server and the virtual server. When determining that the correspondence relation is required, the configuration data search function section 101 proceeds to processing by the configuration data relation function section 104. For example, the configuration data search function section 101 sends a control command to call (or start) the configuration data relation function section 104. The configuration data relation function section 104 performs an operation of acquiring the configuration data of the physical server and the virtual server (operations in FIG. 7 and FIG. 8), generates response data to the search request, and transmits the response data to a requesting source through the configuration data search function section 101. Then, the processing is completed.

(2) Mode of Previously Executing Processing

When processing is periodically executed by use of a timer, or when a notification of an event such as configuration change occurs, or when a relating request from the user is generated, the configuration data relation function section 104 executes the relation processing. At this time, the configuration data relation function section 104 collates (compares) all the configuration data of the physical servers and the configuration data of the virtual servers that exist in the configuration data database 102, identifies the correspondence relation of the data, and stores data of the identified correspondence relation in a form different from the form of each of configuration data in the configuration data database 102. The data of the identified correspondence relation can be stored in a form such as "a correspondence table between the physical server and the virtual server" in a storage area prepared in the configuration data relation function section 104. By previously preparing the correspondence relation data, the configuration data relation function section 104 does not need to execute the configuration data relation processing again when receiving the search request, and the configuration data search function section 101 generates the search result, by referring to the stored correspondence relation data. Thus, concentration of processing loads can be avoided at the search processing and processing time can be reduced.

(Features of First Exemplary Embodiment)

In the present exemplary embodiment, the virtual server identification data generated by the server virtualization function of the physical server is referred to by the OS in the virtual server and stored in the virtual server. The data collected from the physical server and the data collected from the virtual server are related with each other in the configuration data management server on the basis of the virtual server identification data. For this reason, the data of the physical server and the data of the virtual server operating on the physical server can be related with each other and referred to on the configuration data management server.

Second Exemplary Embodiment

A second exemplary embodiment of the present invention will be described below in detail.

(Basic Configuration)

Figure 9:
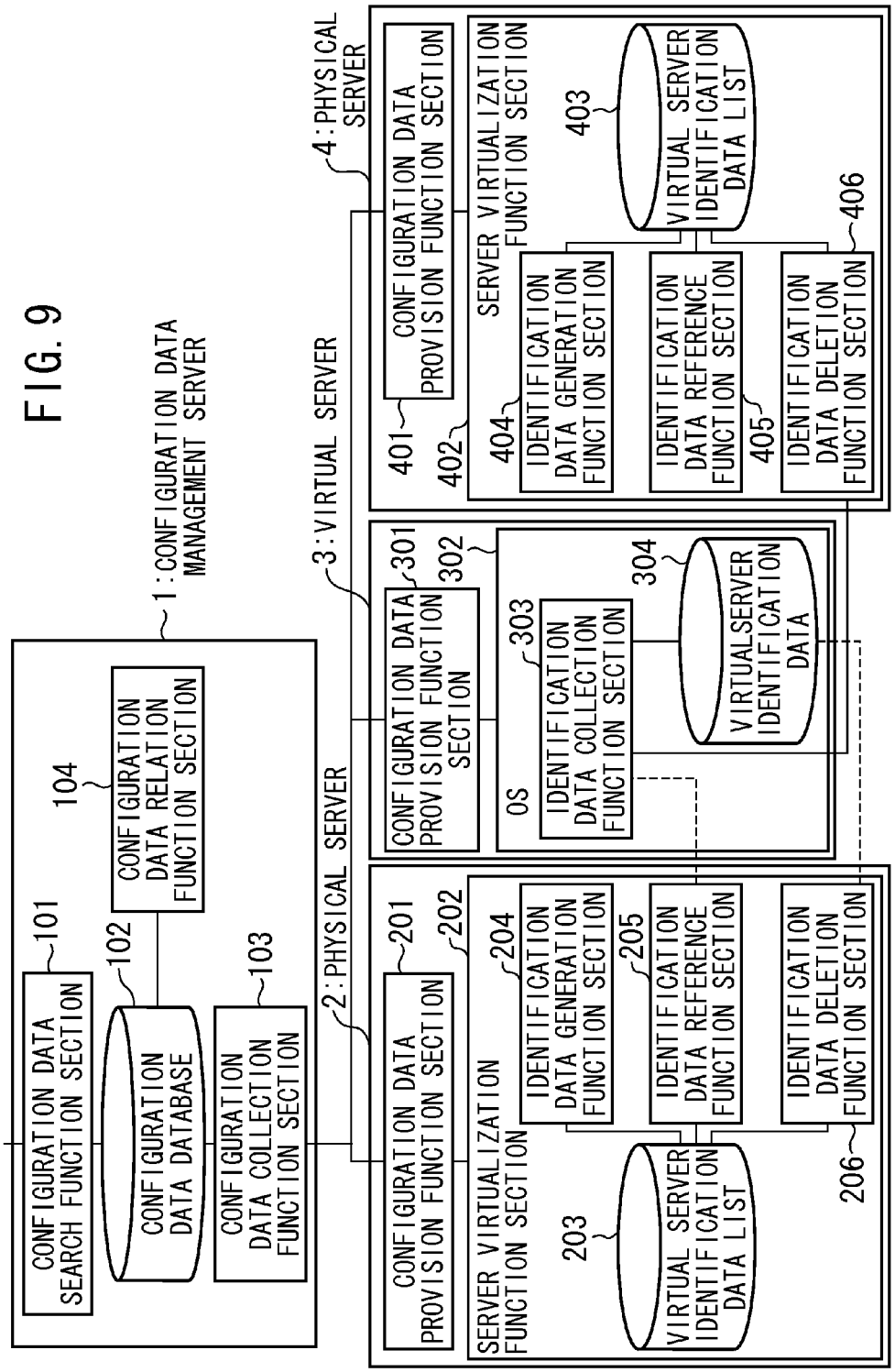
FIG. 9 is a block diagram showing a configuration of a second exemplary embodiment of the present invention.

Referring to FIG. 9, the configuration data management system according to the second exemplary embodiment of the present invention is further provided with a physical server 4 as a migration destination of the virtual server 3, in addition to the configuration in FIG. 1.

That is, the configuration data management system according to the second exemplary embodiment of the present invention is provided with the configuration data management server 1, the physical server 2, the virtual server 3 and the physical server 4.

The configuration data management server 1 manages a server configuration in the network system. One or more physical servers 2 exist in the network system. The virtual server 3 operates (works) on the physical server 2. The physical server 4 is a migration destination of the virtual server 3.

The configuration of the configuration data management server 1 and the configuration of the virtual server 3 are basically same as those in the first exemplary embodiment.

Although the configuration of the physical server 2 is basically same as that in the first exemplary embodiment, the physical server 2 in the present exemplary embodiment is further provided with an identification data deletion function section 206 in the server virtualization function section 202. That is, the physical server 2 is provided with the configuration data provision function section 201 and the server virtualization function section 202. The server virtualization function section 202 is provided with the virtual server identification data list 203, the identification data generation function section 204, the identification data reference function section 205, and the identification data deletion function section 206.

The physical server 4 has a configuration that is similar to that of the physical server 2. That is, the physical server 4 is provided with a configuration data provision function section 401 and a server virtualization function section 402. The server virtualization function section 402 is provided with a virtual server identification data list 403, an identification data generation function section 404, an identification data reference function section 405, and an identification data deletion function section 406.

The virtual server 3 is generated by the server virtualization function section 202 of the physical server 2.

The virtual server 3 is transferred to the server virtualization function section 402 of the physical server 4 by a migration function of the server virtualization function section 202.

At this time, the identification data deletion function section 206 of the server virtualization function section 202 deletes the virtual server identification data 304 from the virtual server identification data list 203. After that, the identification data generation function section 404 of the server virtualization function section 402 generates new virtual server identification data 304 and stores the new virtual server identification data 304 in the virtual server identification data list 403.

(Operation of Second Exemplary Embodiment)

Figure 10:
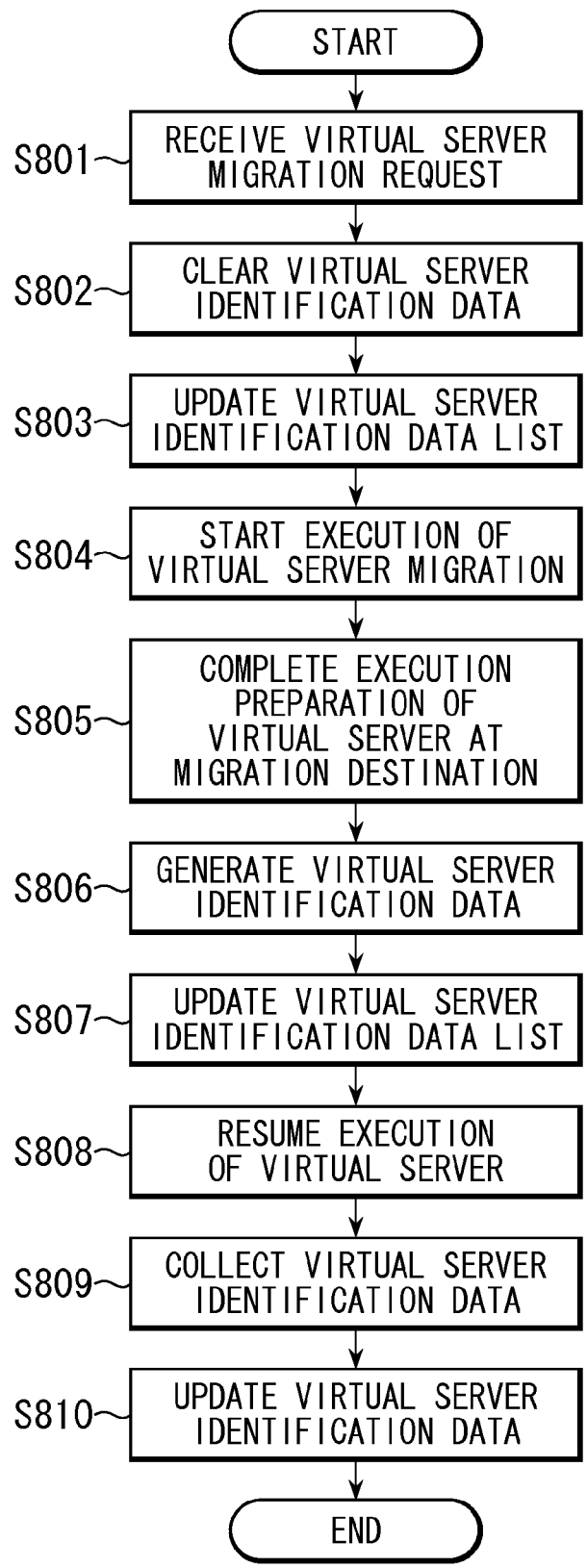
FIG. 10 is a flow chart showing an operation of updating virtual server identification data with migration processing of the virtual server in the second exemplary embodiment.

Next, an operation of the present exemplary embodiment will be described with reference to a flow chart in FIG. 10. Here, as in the first exemplary embodiment, it is assumed that the virtual server 3 operates on the physical server 2.

The identification data generation function section 204 on the physical server 2 generates the identification data of the virtual server 3, stores the identification data in the virtual server identification data list 203, and stores the identification data in the OS 302 of the virtual server 3 as the virtual server identification data 304.

Here, the situation in which the virtual server 3 is migrated to the physical server 4 will be described.

(1) Step S801

The server virtualization function section 202 of the physical server 2 receives a migration request of the virtual server 3 from the user or the application through the network.

(2) Step S802

When receiving the migration request of the virtual server 3, the server virtualization function section 202 first tries to clear (delete) the virtual server identification data 304 of the virtual server 3 by using the identification data deletion function section 206. Actually, since the virtual server identification data 304 is updated to new identification data after the migration, the server virtualization function section 202 need not to perform any processing at this time.

(3) Step S803

Next, the identification data deletion function section 206 deletes the identification data of the migrated virtual server 3 from the virtual server identification data list 203.

(4) Step S804

Next, the server virtualization function section 202 starts the migration processing of the virtual server 3. Here, it is supposed that the migration destination of the virtual server 3 is the physical server 4. That is, the server virtualization function section 202 of the physical server 2 executes the migration of the program and data of the virtual server 3 to the server virtualization function section 402 of the physical server 4 as the migration destination.

(5) Step S805

The server virtualization function section 402 of the physical server 4 prepares the execution of the virtual server 3 and upon completion of the preparation, notifies it to the identification data generation function section 404. That is, the server virtualization function section 402 executes reception or conversion of the program and data of the virtual server 3.

(6) Step S806

When the virtual server 3 becomes possible in restart on the server virtualization function section 402, the identification data generation function section 404 generates new virtual server identification data 304.

(7) Step S807

The identification data generation function section 404 adds the newly generated virtual server identification data 304 to the virtual server identification data list 403.

(8) Step S808

The server virtualization function section 402 restarts the execution of the virtual server 3 on the physical server 4.

(9) Step S809

When the virtual server 3 restarts on the physical server 4, the identification data collection function section 303 receives the new virtual server identification data from the identification data reference function section 405 of the server virtualization function section 402. For example, the identification data collection function section 303 receives the new virtual server identification data spontaneously transmitted from the identification data reference function section 405 of the server virtualization function section 402 (push-type). Alternatively, according to an instruction or command from the OS 302 of the virtual server 3, the identification data collection function section 303 request the new virtual server identification data to the identification data reference function section 405 of the server virtualization function section 402, and receives the new virtual server identification data as a response (pull-type).

(10) Step S810

The identification data collection function section 303 stores the received new virtual server identification data as the virtual server identification data 304. That is, the identification data collection function section 303 updates the virtual server identification data 304.

Figure 2:
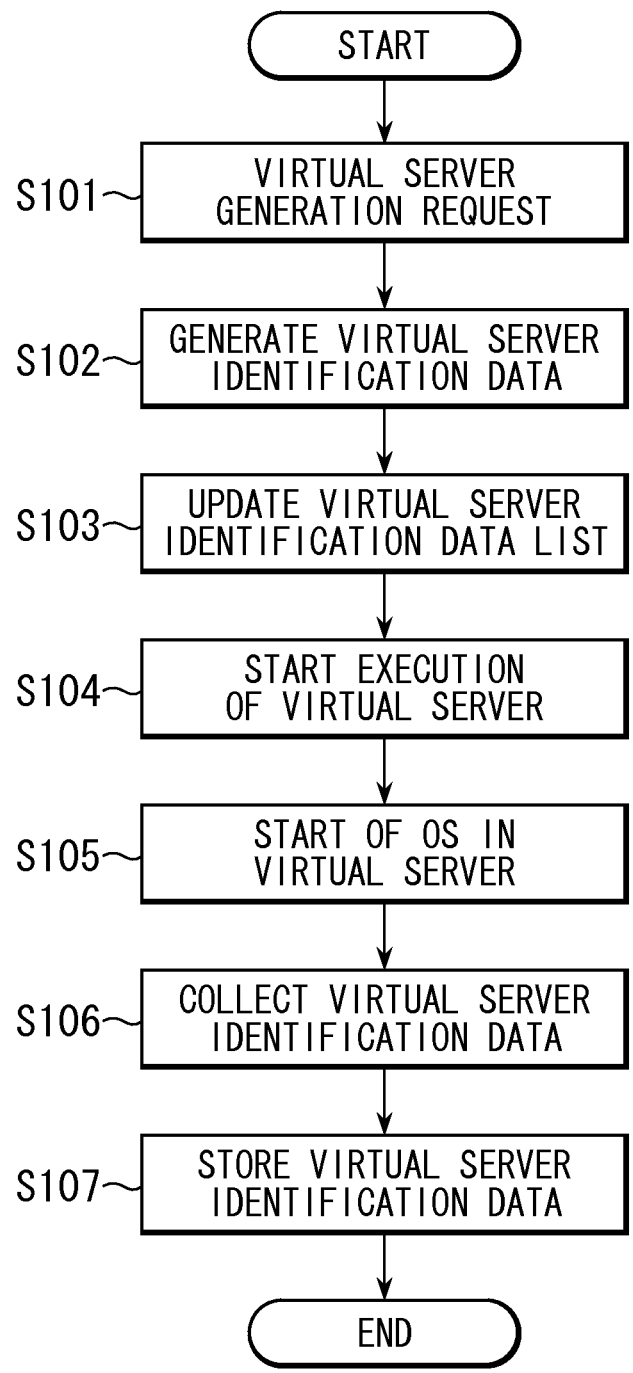
FIG. 2 is a flow chart showing an operation of generating and storing virtual server identification data in the first exemplary embodiment.

After completion of the migration processing from the physical server 2 to the physical server 4, the configuration data management server 1 recollects the configuration data of the physical server 2, the virtual server 3, and the physical server 4 according to the operations in flow charts of FIGS. 2 to 4, and updates the configuration data database 102.

Further, according to the operations in flow charts of FIG. 5 to FIG. 6, the configuration data management server 1 searches the configuration data of the physical server 2, the virtual server 3 and the physical server 4, in the updated configuration data database 102. Accordingly, the configuration data after the virtual machine migration can be collected and referred to.

(Features of Second Exemplary Embodiment)

In the present exemplary embodiment, upon migration of the virtual machine, the virtual server identification data is deleted from the virtual server identification data list of the migration source, new virtual server identification data is generated on the server virtualization function of the migration destination and stored in the server virtualization function and the OS of the virtual server. Also, the data collected from the physical server and the data collected from the virtual server are related with each other in the configuration data management server on the basis of the virtual server identification data. Even after migration of the virtual server, the data of the physical server and the data of the virtual server operating on the physical server can be related with each other and referred to on the configuration data management server.

In the present exemplary embodiment, when the migration of the virtual server is repeatedly executed, update of the virtual server identification data can be repeated in the same procedure. Therefore, when the migration of the virtual server is executed plural times, it is possible to grasp on which of the physical servers the virtual server operates at the present time, through the configuration data management server.

The above-mentioned exemplary embodiments can be implemented in combination.

IMPLEMENTATION EXAMPLE 1

Next, an operation of the present exemplary embodiment will be described by using specific implementation examples.

(Configuration of Implementation Example 1)

Figure 11:
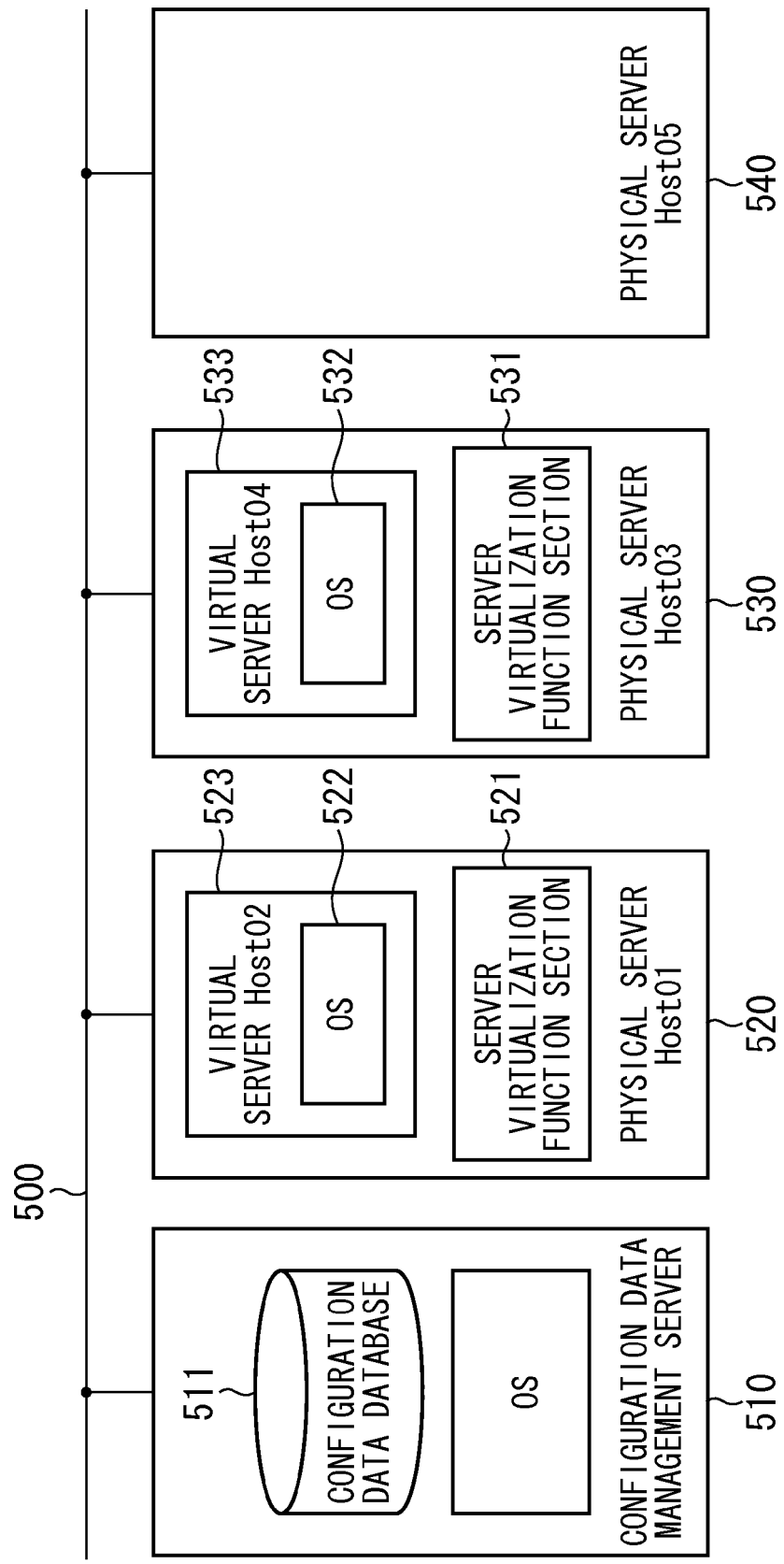
FIG. 11 is a block diagram showing a configuration of an implementation example 1 of the present invention.

FIG. 11 shows a configuration example of the configuration data management system in the specific implementation example.

A configuration data management server 510 and three physical servers 520, 530, and 540 are connected to each other through a network 500. A server virtualization function section 521 is installed in the physical server 520. A server virtualization function section 531 is installed in the physical server 530. A virtual server 523 operates on the server virtualization function section 521. A virtual server 533 operates on the server virtualization function section 531.

The configuration data management server 510 corresponds to the configuration data management server 1 shown in FIG. 1. Each of the three physical servers 520, 530, and 540 corresponds to the physical server 2 shown in FIG. 1 (or the physical server 4 shown in FIG. 9). Each of the virtual servers 523 and 533 corresponds to the virtual server 3 shown in FIG. 1. That is, the configuration of each server shown in FIG. 11 conforms to the configuration of each server shown in FIG. 1.

At this time, each of the server virtualization function section 521 and the server virtualization function section 531 corresponds to the server virtualization function section 202 shown in FIG. 1, and is provided with the virtual server identification data list 203, the identification data generation function section 204, and the identification data reference function section 205. Each of an OS 522 and an OS 532 corresponds to the OS 302 shown in FIG. 1, and is provided with the identification data collection function section 303 and the virtual server identification data 304.

(Operation of Implementation Example 1)

When the configuration data management server 510 collects the configuration data of all of the virtual servers and the physical servers, which are to be managed, through the network, although data indicating that the physical server 520 is Host01 and one virtual server 523 operates on the virtualization function section 521 of the physical server 520 can be obtained, it is generally impossible to identify the virtual server 523 is Host02, Host04 or Host05.

According to the present invention, the identification data generation function section 204, the identification data reference function section 205, and the virtual server identification data list 203 in FIG. 1 are prepared in the server virtualization function section 521, and the identification data collection function section 303 and the virtual server identification data 304 in FIG. 1 are prepared in the OS 522 operating on the virtual server 523. Thus, a problem is solved.

In the Host01 (physical server 520), the server virtualization function section 521 generates the virtual server 523. At this time, according to the flow chart in FIG. 2, the identification data generation function section 204 generates the virtual server identification data 304 and stores it in the virtual server identification data list 203. In response to an instruction or command from the OS 522 started in the virtual server 523, the identification data collection function section 203 collects the virtual server identification data stored in the virtual server identification data list 203, and stores it as the virtual server identification data 304.

Figure 12:
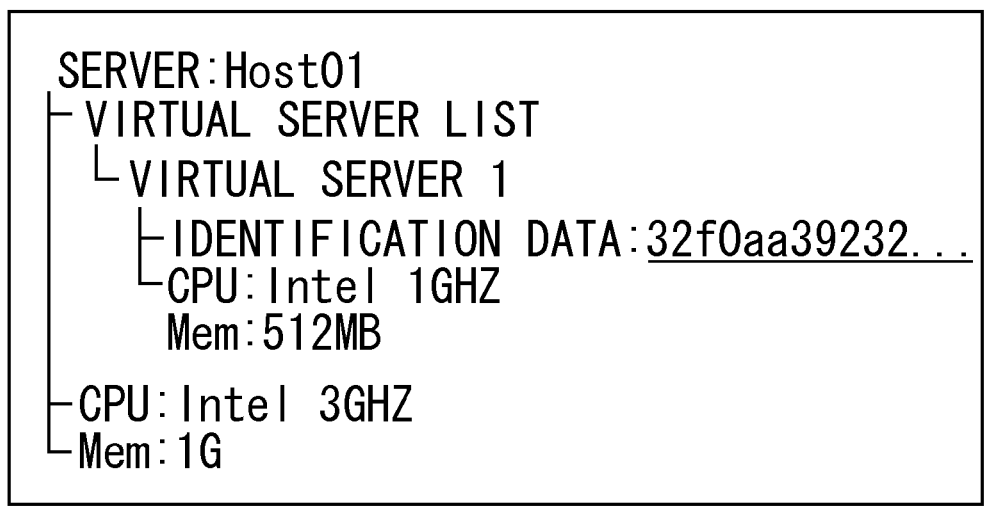
FIG. 12 is a diagram showing configuration data of host01 in the implementation example 1 of the present invention.

FIG. 12 shows a collection result of the configuration data of the Host01 (physical server 520) according to the operation shown in the flow chart of FIG. 3.

Figure 13:
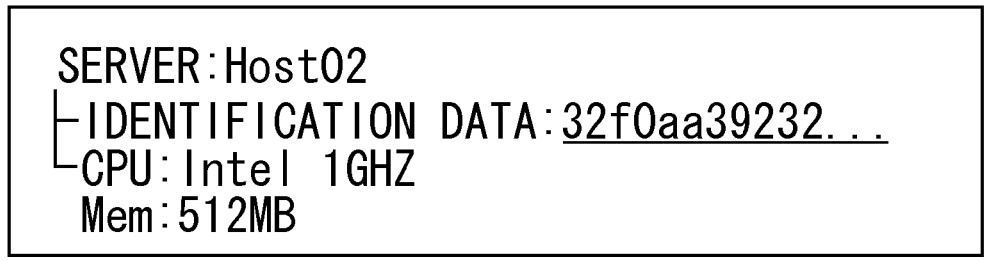
FIG. 13 is a diagram showing configuration data of host02 in the implementation example 1 of the present invention.

FIG. 13 shows a collection result of the configuration data of the Host02 (virtual server 523) according to the operation shown in the flow chart of FIG. 4.

Figure 14:
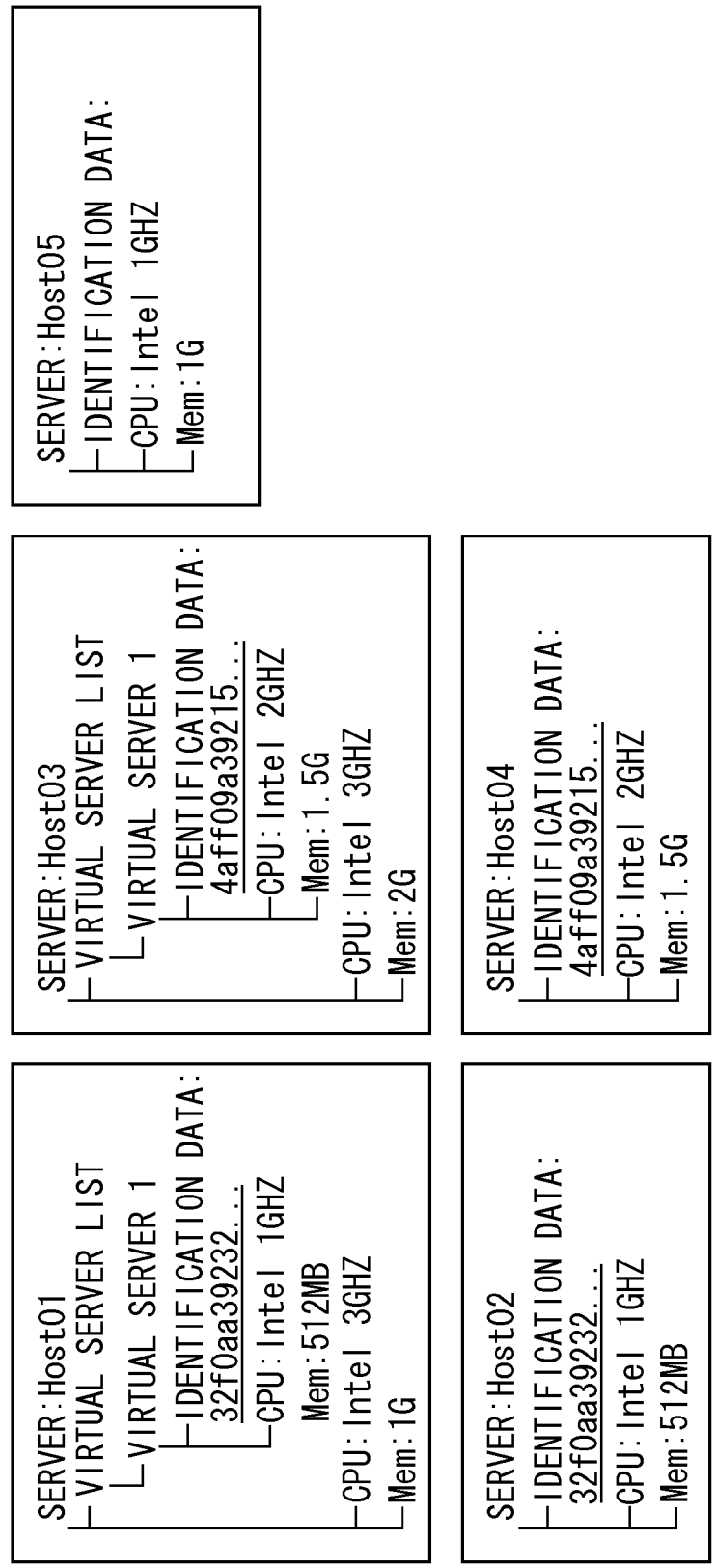
FIG. 14 is a diagram showing configuration data stored in a configuration data database in the implementation example 1 of the present invention.

Similarly, when the configuration data of all of the virtual servers and the physical servers of the Host03 to Host05 are collected, the configuration data database 511 of the configuration data management server 510 stores the configuration data of five servers shown in FIG. 14. The configuration data database 511 corresponds to the configuration data database 102 shown in FIG. 1.

Here, an example in which processing of the search request of the configuration data: "How is the CPU performance of the physical server that hosts the Host02?" will be considered.

The search request processing to the configuration data database 511 is executed according to the operations shown in the flow chart of FIG. 6.

Since the search request is related to a request to acquire the configuration data of the physical server 520 on which the virtual server 523 operates, the configuration data management server 510 calls the processing shown in the flow chart of FIG. 7.

First, with reference to the configuration data of the virtual server Host02, the configuration data management server 510 acquires "32f0aa39232 . . . " as the virtual server identification data 304 (S603 in FIG. 7).

Next, the configuration data management server 510 searches the configuration data of the physical server having "32f0aa39232 . . . " as the virtual server identification data 304 in the configuration data database 511.

As a result, the configuration data management server 510 acquires the configuration data of the Host01, which contains "32f0aa39232 . . . ".

The configuration data management server 510 can refer to CPU performance data from the acquired configuration data of the Host01, and obtains a result of "3 GHZ".

Another example in which a search request: "What is a host name of the virtual server 523 that operates on the Host03?" is received will be considered.

Since this search request is related to a request to acquire the configuration data of the virtual server 523 virtualized on the physical server 520, the processing shown in the flow chart of FIG. 8 is called.

First, the configuration data management server 510 refers to the configuration data database 511 for the configuration data of the physical server 533 (Host03).

Further, the configuration data management server 510 acquires "4af09a39215 . . . " as the virtual server identification data 304 from the virtual server identification data list 203 (S703 in FIG. 8).

Next, the configuration data management server 510 searches the configuration data of the server having "4af09a39215 . . . " as the virtual server identification data 304 and acquires the configuration data of the Host04. Accordingly, the configuration data management server 510 can acquire the "Host04" as the host name.

IMPLEMENTATION EXAMPLE 2

Although the above-mentioned implementation example 1 describes an example of environment in which the virtual server uses resources (hardware resources) of one physical server, or an example of environment in which one or more virtual servers operates on one physical server, the present invention can be also applied to environment in which one virtual server uses resources of a plurality of physical servers (one or more physical servers realizes one virtual server).
(Configuration of Implementation Example 2)

Figure 15:
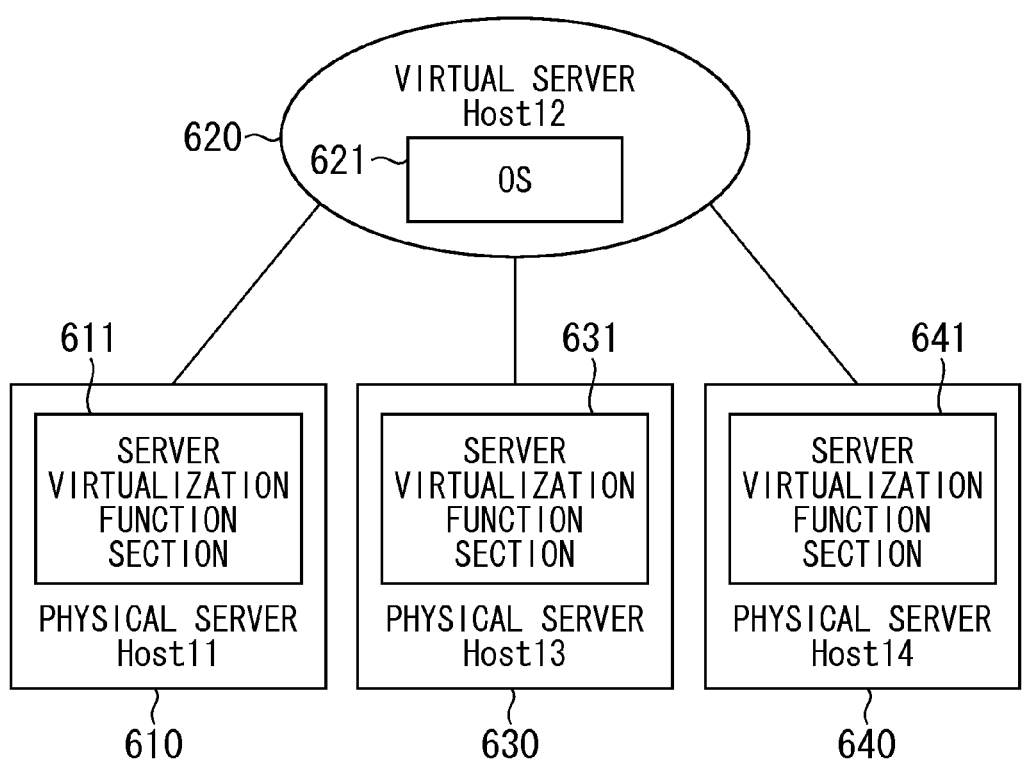
FIG. 15 is a block diagram showing a concept of an implementation example 2 of the present invention.

FIG. 15 shows an example of a configuration of a configuration data management system in this implementation example.

In this configuration data management system, three physical servers 610, 630, and 640 cooperate to operate one virtual server 620. Although the configuration data management server is not described herein, the configuration data management server actually exists on the same network. For example, in the example of the configuration of the configuration data management system in FIG. 11, the three physical servers 610, 630, and 640 may exist.

A server virtualization function section 611 is installed in the physical server 610. An OS 621 is installed in the virtual server 620. A server virtualization function section 631 is installed in the physical server 630. A server virtualization function section 641 is installed in the physical server 640. The server virtualization function section 611, the server virtualization function section 631, and the server virtualization function section 641 operate the virtual server 620 according to their burdens of resources.

Each of the three physical servers 610, 630, and 640 corresponds to the physical server 2 in FIG. 1 (or the physical server 4 shown in FIG. 9). The virtual server 620 corresponds to the virtual server 3 in FIG. 1. That is, the configuration of each server shown in FIG. 11 conforms to the configuration of each server shown in FIG. 1.

At this time, each of the server virtualization function section 611, the server virtualization function section 631, and the server virtualization function section 641 corresponds to the server virtualization function section 202 in FIG. 1, and is provided with the virtual server identification data list 203, the identification data generation function section 204, and the identification data reference function section 205. The OS 621 corresponds to the OS 302 in FIG. 1, and is provided with the identification data collection function section 303 and the virtual server identification data 304.
(Operation of Implementation Example 2)

Assuming that the server virtualization function section 611 of the physical server 610, the virtualization function section 631 of the physical server 630, and the virtualization function section 641 of the physical server 640 commonly operate the one virtual server 620, the identification data generation function section 204 generates the virtual server identification data 304 and stores it in the virtual server identification data list 203, according to the flow chart in FIG. 2 in each of the physical server 610, the physical server 630, and the physical server 640. According to an instruction or command from the OS 621 started in the virtual server 620, the identification data collection function section 203 collects the virtual server identification data stored in the virtual server identification data list 203 and stores it as the virtual server identification data 304.

The identification data collection function section 303 contained in the OS 621 of the virtual server 620 acquires the virtual server identification data 304 generated in each of the physical server 610, the physical server 630, and the physical server 640 from the identification data reference function section 205 of each of the physical server 610, the physical server 630, and the physical server 640.

Figure 16:
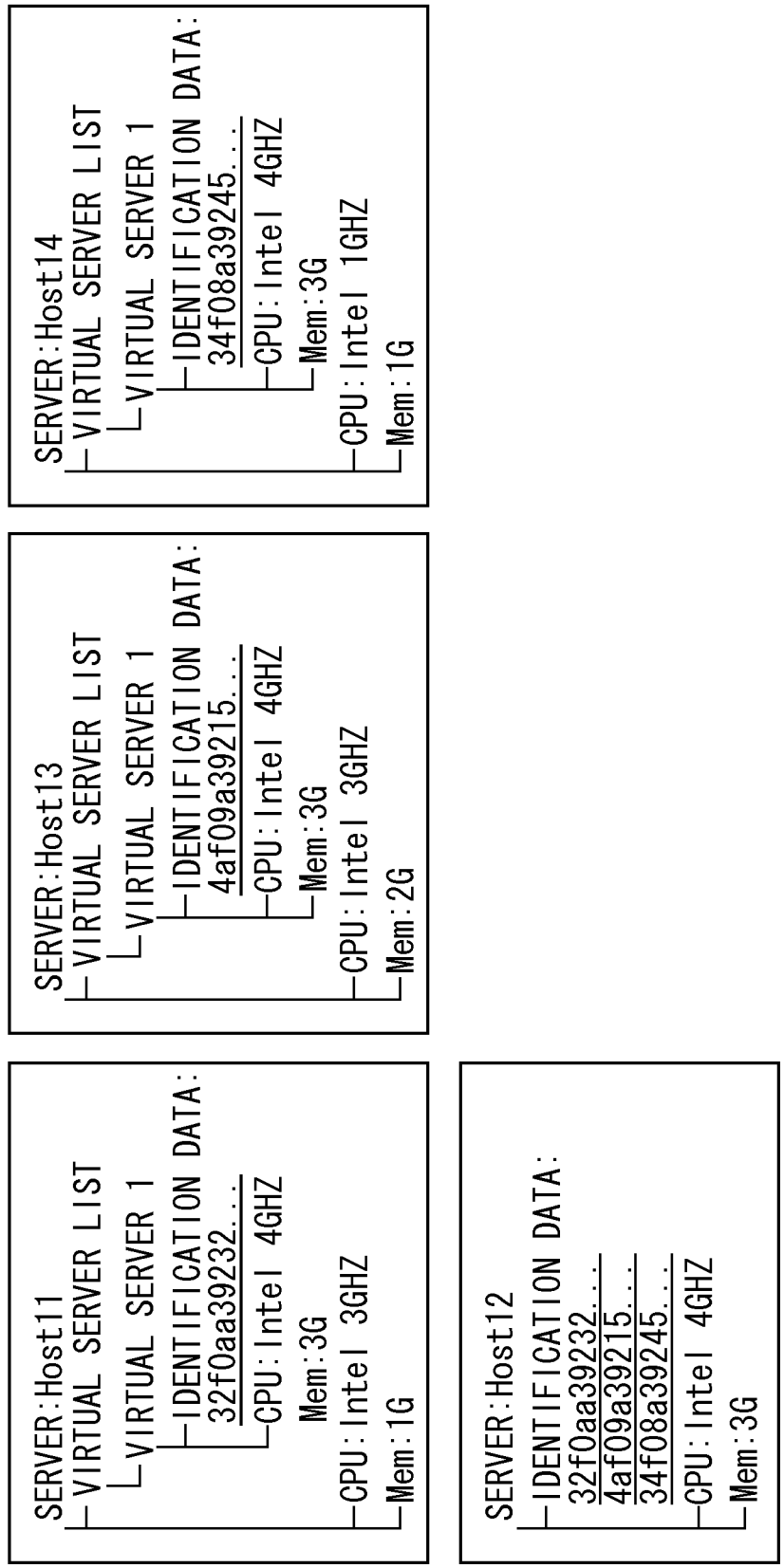
FIG. 16 is a diagram showing configuration data stored in the configuration data database in the implementation example 2 of the present invention.

At this time, the identification data collection function section 303 contained in the OS 621 of the virtual server 620 relates the virtual server identification data 304 acquired from the physical server 610, the physical server 630, and the physical server 640 with each other, as shown in FIG. 16, such that all of the acquired virtual server identification data 304 become the identification data of the virtual server 620. That is, the virtual server has the same number of virtual server identification data as the number of the physical servers using the resources.

For example, when collecting the configuration data of the virtual server 620, the configuration data collection function section 103 of the configuration data management server in FIG. 1 acquires all of the virtual server identification data 304 held by the virtual server 620 as the identification data of the virtual server 620.

INDUSTRIAL APPLICABILITY

The present invention can be applied to the configuration data management system for a system including the virtual server. The present invention can be also applied to integrated operation management middleware for the system including the virtual server.

SUMMARY

As described above, the configuration data management system of the present invention is provided with means adapted to generate virtual server identification data that uniquely indicates a virtual server in a network system to which a physical server belongs, to the virtual server operating in a server virtualization function, means adapted to enable the virtual server identification data to be referred to from the virtual server, means adapted to collect the virtual server identification data generated in the server virtualization function from an OS that operates on the virtual server, means adapted to collect configuration data containing the virtual server identification data from a plurality of servers, and means adapted to relate the configuration data of the physical server with the configuration data of the virtual server on the basis of the virtual server identification data.

The configuration data management system of the present invention is provided with means adapted to generate virtual server identification data that uniquely indicates a virtual server in a network system to which a physical server belongs, to the virtual server operating in a server virtualization function, means adapted to store the virtual server identification data in the server virtualization function, means adapted to enable the virtual server identification data to be referred to from the virtual server, means adapted to collect the virtual server identification data generated in the server virtualization function from an OS that operates on the virtual server, means adapted to store the virtual server identification data in the OS that operates on the virtual server, means adapted to collect configuration data containing the virtual server identification data from a plurality of servers, means adapted to store the configuration data collected from the plurality of servers in a configuration data database, means adapted to search the configuration data database, and means adapted to relate the configuration data of the physical server with the configuration data of the virtual server by using the virtual server identification data.

The configuration data management system of the present invention further is provided with migration means adopted to transfer the virtual server to another physical server, means adapted to delete the virtual server identification data from a virtual server identification data list before the migration, means adapted to generate new virtual server identification data in the server virtualization function of the destination after the migration, and means adapted to update the virtual server identification data in the OS that operates on the virtual server after the migration, in addition to the above-mentioned configuration.

A configuration data management method of the present invention includes a step of generating virtual server identification data that uniquely indicates a virtual server in a network system to which a physical server belongs, to the virtual server operating in a server virtualization function, a step of enabling the virtual server identification data to be referred to from the virtual server, a step of collecting the virtual server identification data generated in the server virtualization function from an OS that operates on the virtual server, a step of collecting configuration data containing the virtual server identification data from a plurality of servers, and a step of relating the configuration data of the physical server with the configuration data of the virtual server on the basis of the virtual server identification data.

A configuration data management method of the present invention includes a step of generating virtual server identification data that uniquely indicates a virtual server in a network system to which a physical server belongs, to the virtual server operating in a server virtualization function, a step of storing the virtual server identification data in the server virtualization function, a step of enabling the virtual server identification data to be referred to from the virtual server, a step of collecting the virtual server identification data generated in the server virtualization function from an OS that operates on the virtual server, a step of storing the virtual server identification data in the OS that operates on the virtual server, a step of collecting configuration data containing the virtual server identification data from a plurality of servers, a step of storing the configuration data collected from the plurality of servers in a configuration data database, a step of receiving a search request for the configuration data database, and a step of relating the configuration data of the physical server with the configuration data of the virtual server by using the virtual server identification data.

The configuration data management method of the present invention further includes a step of performing migration of transferring the virtual server to another physical server, a step of deleting the virtual server identification data from a virtual server identification data list before migration, a step of generating new virtual server identification data in the server virtualization function of the destination after migration, and a step of updating the virtual server identification data in the OS that operates on the virtual server after migration.

A configuration data management program of the present invention is a program that allows a computer to execute processing of generating virtual server identification data that uniquely indicates a virtual server in a network system to which a physical server belongs, to the virtual server operating in a server virtualization function, processing of enabling the virtual server identification data to be referred to from the virtual server, processing of collecting the virtual server identification data generated in the server virtualization function from an OS that operates on the virtual server, processing of collecting configuration data containing the virtual server identification data from a plurality of servers, and processing of relating the configuration data of the physical server with the configuration data of the virtual server on the basis of the virtual server identification data.

A configuration data management program of the present invention is a program that allows a computer to execute processing of generating virtual server identification data that uniquely indicates a virtual server in a network system to which a physical server belongs, to the virtual server operating in a server virtualization function, processing of storing the virtual server identification data in the server virtualization function, processing of enabling the virtual server identification data to be referred to from the virtual server, processing of collecting the virtual server identification data generated in the server virtualization function from an OS that operates on the virtual server, processing of storing the virtual server identification data in the OS that operates on the virtual server, processing of collecting configuration data containing the virtual server identification data from a plurality of servers, processing of storing the configuration data collected from the plurality of servers in a configuration data database, processing of searching the configuration data database, and processing of relating the configuration data of the physical server with the configuration data of the virtual server by using the virtual server identification data.

The configuration data management program of the present invention is a program that allows the computer to further execute migration processing of transferring the virtual server to another physical server, processing of deleting the virtual server identification data from a virtual server identification data list before migration, processing of generating new virtual server identification data in the server virtualization function of the destination after migration, and processing of updating the virtual server identification data in the OS that operates on the virtual server after migration.

A virtual server hosting server of the present invention is provided with means adapted to generate virtual server identification data that uniquely indicates a virtual server in a network system to which a physical server belongs, to the virtual server operating in a server virtualization function, means adapted to store the virtual server identification data in the server virtualization function, means adapted to enable the virtual server identification data to be referred to from the virtual server, means adapted to collect the virtual server identification data generated in the server virtualization function from an OS that operates on the virtual server, and means adapted to store the virtual server identification data in the OS that operates on the virtual server.

A configuration data management server of the present invention is provided with means adapted to collect configuration data containing virtual server identification data from a plurality of servers, means adapted to store the configuration data collected from the plurality of servers in a configuration data database, means adapted to search the configuration data database, and means adapted to relate the configuration data of the physical server with the configuration data of the virtual server by using the virtual server identification data.

With the techniques described above, by configuration data search function, the data of the physical server and the data of the virtual server that operates on the physical server can be related with each other and referred to. The reason is in that the configuration data relation function identifies the dependence between the data of the physical server and the data of the virtual serve by using the virtual machine identification data, and the data is stored in the configuration data database.

The correspondence between the data of the physical server and the data of the virtual server that operates on the physical server can be acquired without logging-in the OS in the virtual server from the server virtualization function. The reason is in that the physical server and the virtual server can share the identification data of the virtual server without log-in processing through the identification data reference function in the server virtualization function and the identification data collection function in the OS of the virtual server.

Further, when the physical server on which the virtual server operates cannot be tracked due to repeated start/stop or migration of the virtual server, the active physical server can be rapidly identified. The reason is in that with reference to the latest configuration data of the physical server and the latest configuration data of the virtual server at the present moment, the configuration data relation function can rapidly identify the correspondence between the data of the physical server and the data of the virtual server.

(Supplemental Note 1)

A physical server is provided with means adapted to store virtual server identification data in a virtual server identification data list when the virtual server identification data is generated, means adapted to perform migration of the virtual server to transfer the virtual server to another physical server, means adapted to delete the virtual server identification data from a virtual server identification data list before migration, means adapted to generate new virtual server identification data of migrated virtual server when the virtual server is migrated from another physical server, and means to store the new virtual server identification data in the virtual server identification data list.

A first data processor and a third data processor in CLAIMS correspond to the physical server. A second data processor corresponds to the configuration data management server.

<Supplement>

Conventionally, the virtual server that operates on one physical server can be grasped, and as long as a system administrator continues to perform monitoring, it is possible to track the virtual server transferred by migration and grasp the virtual server that operates on the physical server as a destination. However, when the virtual server is not monitored for a long time for any reason, and the migration of the virtual server is repeated many times due to automatic processing for load distribution on the physical server or an operation of another system administrator, which physical server the virtual server operates on becomes unclear from the outside, and therefore, and whether the virtual server is active or inactive becomes also unknown. For example, when the virtual server is generated and used for testing and then, the virtual server is left carelessly without being terminated, it is difficult to grasp the location of the virtual server if the virtual server is migrated automatically or by another person, when it is found after elapse of a long time.

The virtual machine ID (VMID) as the identification data of the conventional virtual machine indicates the active virtual server on the physical server, is individually set for each physical server, and is not used in the outside. The virtual machine ID allocated to the virtual server cannot be recognized from the side of the virtual server.

According to the present invention, the physical server relates its configuration data of the virtual server that operates on the physical server with the identification data of the virtual server, the virtual server relates its configuration data with its identification data acquired from the physical server, an external server such as the configuration data management server collects the configuration data of the physical server and the configuration data of the virtual server, and the configuration data of the physical server is related with the configuration data of the virtual server by using the identification data as a key. Thus, even after losing sight of a certain virtual server, the system administrator can use the external server such as the configuration data management server to grasp on which physical server the virtual server operates at this moment.

According to the present invention, to the external server such as the configuration data management server, the physical server transmits the identification data of the virtual server operating on the physical server, and the virtual server transmits its identification data acquired from the physical server. In this manner, the external server such as the configuration data management server can relate the physical server with the virtual server by using the identification data of the virtual server as the key. That is, the configuration data of the physical server and the virtual server is not necessary.

When the configuration data of the physical server and the configuration data of the virtual server are collected, by comparing the configuration data of the virtual server with the configuration data of the virtual server, which is contained in the configuration data of the physical server, the correspondence relation between the physical server and the virtual server by using the identification data of the virtual server as the key can be proved.

Although the exemplary embodiments of the present invention have been described in detail, the present invention is not limited to the above-mentioned exemplary embodiments, and changes not deviating from the gist of the present invention are contained in the present invention.

This application claims a priority based on Japanese Patent Application No. 2010-003348 and the disclosure thereof is incorporated herein by reference.

The invention claimed is:

1. A configuration data management system comprising a physical server, a first data processing apparatus and a second data processing apparatus,
   wherein said physical server comprises said first data processing apparatus, and
   wherein said first data processing apparatus comprises:
      an identification data generation function section configured to generate virtual server identification data, which indicates a virtual server uniquely in a network system to which said first data processing apparatus belongs, to said virtual server which operates by using resources of said first data processing apparatus;
      an identification data reference function section configured to transmit said virtual server identification data to said virtual server; and
      a first configuration data provision function section configured to transmit said virtual server identification data to said second data processing apparatus,
   wherein said virtual server comprises:
      an identification data collection function section configured to receive said virtual server identification data from said first data processing apparatus; and
      a second configuration data provision function section configured to transmit said virtual server identification data to said second data processing apparatus, and
   wherein said second data processing apparatus comprises:
      a configuration data collection function section configured to receive said virtual server identification data from said first data processing apparatus and configured to receive said virtual server identification data from said virtual server;
      a configuration data relation function section configured to store a correspondence relation of said first data processing apparatus and said virtual server based on said virtual server identification data; and
      a configuration data search function section configured to receive a search request on said virtual server and configured to output the correspondence relation between said first data processing apparatus and said virtual server in response to said search request.

2. The configuration data management system according to claim 1, wherein said first configuration data provision function section is further configured to transmit configuration data of said first data processing apparatus to said second data processing apparatus,
   wherein said second configuration data provision function section is further configured to transmit configuration data of said virtual server to said second data processing apparatus,
   wherein said configuration data collection function section is further configured to receive the configuration data of said first data processing apparatus from said first data processing apparatus,
   wherein said configuration data collection function section is further configured to receive the configuration data of said virtual server from said virtual server, and
   wherein said configuration data search function section is further configured to output the configuration data of said first data processing apparatus and the configuration data of said virtual server.

3. The configuration data management system according to claim 1, further comprising a third data processing apparatus,
   wherein said identification data generation function section is further configured to generate first virtual server identification data which indicates said virtual server uniquely in the network system to which said first data processing apparatus belongs, to said virtual server which operates by using the resources of said first data processing apparatus and resources of said third data processing apparatus,
   wherein said identification data reference function section is further configured to transmit said first virtual server identification data to said virtual server
   wherein said identification data reference function section is further configured to transmit said first virtual server identification data to said second data processing apparatus,
   wherein said third data processing apparatus comprises:
      another identification data generation function section configured to generate second virtual server identification data which indicates said virtual server uniquely in a network system to which said third data processing apparatus belongs, to said virtual server;
      another identification data reference function section configured to transmit said second virtual server identification data to said virtual server; and
      a third configuration data provision function section configured to transmit said second virtual server identification data to said second data processing apparatus,
   wherein said identification data collection function section is further configured to receive said first virtual server identification data from said first data processing apparatus,
   wherein said identification data collection function section is further configured to receive said second virtual server identification data from said third data processing apparatus,
   wherein said second configuration data provision function section is further configured to transmit said first virtual server identification data and said second virtual server identification data to said second data processing apparatus, wherein said configuration data collection function section is further configured to receive said first virtual server identification data from said first data processing apparatus,
   wherein said configuration data collection function section is further configured to receive said second virtual server identification data from said third data processing apparatus,
   wherein said configuration data collection function section is further configured to receive said first virtual server identification data and said second virtual server identification data from said virtual server,
   wherein said configuration data relation function section is further configured to store a correspondence relation between said first data processing apparatus, said third data processing apparatus and said virtual server based on said first virtual server identification data and said second virtual server identification data, wherein said configuration data search function section is further configured to receive a search request on said virtual server, and wherein said configuration data search function section is further configured to output the correspondence relation between said first data processing apparatus, said third data processing apparatus, and said virtual server in response to said search request.

4. The configuration data management system according to claim 3, wherein said first configuration data provision function section is further configured to transmit configuration data of said first data processing apparatus to said second data processing apparatus, wherein said third configuration data provision function section is further configured to transmit configuration data of said third data processing apparatus to said second data processing apparatus, wherein said second configuration data provision function section is further configured to transmit configuration data of said virtual server to said second data processing apparatus, and wherein said configuration data collection function section is further configured to receive the configuration data of said first data processing apparatus from said first data processing apparatus, wherein said configuration data collection function section is further configured to receive the configuration data of said third data processing apparatus from said third data processing apparatus, wherein said configuration data collection function section is further configured to receive the configuration data of said virtual server from said virtual server and wherein said configuration data search function section is further configured to output the configuration data of said first data processing apparatus, the configuration data of said third data processing apparatus and the configuration data of said virtual server.

5. A second data processing apparatus, included in a physical server, comprising:

a configuration data collection function section configured to receive from a first data processing apparatus, virtual server identification data which is generated by said first data processing apparatus and which uniquely indicates a virtual server which operates on said first data processing apparatus in a network system to which said first data processing apparatus belongs and configured to receive from said virtual server, the virtual server identification data which is transmitted to said virtual server from said first data processing apparatus and is held by said virtual server;

a configuration data relation function section configured to store a correspondence relation between said first data processing apparatus and said virtual server based on the received virtual server identification data; and a configuration data search function section configured to receive a search request on said virtual server and configured to output the data which indicates the correspondence relation between said first data processing apparatus and said virtual server in response to said search request.

6. The second data processing apparatus according to claim 5, wherein said configuration data collection function section is further configured to receive configuration data of said first data processing apparatus from said first data processing apparatus, wherein said configuration data collection function section is further configured to receive configuration data of said virtual server from said virtual server and wherein said configuration data search function section is further configured to output the configuration data of said first data processing apparatus and the configuration data of said virtual server.

7. The second data processing apparatus according to claim 5, wherein said configuration data collection function section is further configured to receive first virtual server identification data which said virtual server has received from said first data processing apparatus and second virtual server identification data which said virtual server has received from said third data processing apparatus, from a virtual server which operates by using resources of said first data processing apparatus and resources of said third data processing apparatus, wherein said configuration data collection function section is further configured to receive said first virtual server identification data from said first data processing apparatus, wherein said configuration data collection function section is further configured to receive said second virtual server identification data from said third data processing apparatus, wherein said configuration data relation function section is further configured to store a correspondence relation between said first data processing apparatus, said third data processing apparatus and said virtual server based on said first virtual server identification data and said second virtual server identification data and wherein said configuration data search function section is further configured to output the correspondence relation between said first data processing apparatus, said third data processing apparatus and said virtual server in response to said search request.

8. The second data processing apparatus according to claim 7, wherein said configuration data collection function section is further configured to receive configuration data of said first data processing apparatus from said first data processing apparatus, wherein said configuration data collection function section is further configured to receive configuration data of said third data processing apparatus from said third data processing apparatus, wherein said configuration data collection function section is further configured to receive configuration data of said virtual server from said virtual server and wherein said configuration data search function section is further configured to output the configuration data of said first data processing apparatus, the configuration data of said third data processing apparatus and the configuration data of said virtual server.

9. A configuration data management method comprising:

a first data processing apparatus generating virtual server identification data which uniquely indicates a virtual server in a network system to which said first data processing apparatus belongs, to a virtual server which operates by using resources of said first data processing apparatus, transmitting said virtual server identification data to said virtual server, and transmitting said virtual server identification data to a second data processing apparatus;

said virtual server receiving said virtual server identification data from said first data processing apparatus and transmitting said virtual server identification data to said second data processing apparatus; and said second data processing apparatus receiving said virtual server identification data from said first data processing apparatus, receiving said virtual server identification data from said virtual server, managing a correspondence relation between said first data processing apparatus and said virtual server based on said virtual server identification data, receiving a search request on said virtual server, and outputting the correspondence relation between said first data processing apparatus and said virtual server in response to said search request.

10. The configuration data management method according to claim 9, further comprising:

said first data processing apparatus transmitting configuration data of said first data processing apparatus to said second data processing apparatus;

said virtual server transmitting configuration data of said virtual server to said second data processing apparatus; and said second data processing apparatus receiving the configuration data of said first data processing apparatus from said first data processing apparatus, receiving the configuration data of said virtual server from said virtual server, and outputting the configuration data of said first data processing apparatus and the configuration data of said virtual server.

11. The configuration data management method according to claim 9, further comprising:

said first data processing apparatus generating first virtual server identification data, transmitting said first virtual server identification data to said second data processing apparatus, and transmitting said first virtual server identification data to said virtual server which operates by using resources of said first data processing apparatus and resources of the third data processing apparatus;

said third data processing apparatus generating second virtual server identification data, transmitting said second virtual server identification data to said second data processing apparatus, and transmitting said second virtual server identification data to said virtual server;

said virtual server receiving said first virtual server identification data from said first data processing apparatus, receiving said second virtual server identification data from said third data processing apparatus, and transmitting said first virtual server identification data and said second virtual server identification data to said second data processing apparatus; and said second data processing apparatus receiving said first virtual server identification data from said first data processing apparatus, receiving said second virtual server identification data from said third data processing apparatus, receiving said first virtual server identification data and said second virtual server identification data from said virtual server, managing a correspondence relation between said first data processing apparatus, said third data processing apparatus and said virtual server based on said first virtual server identification data and said second virtual server identification data, receiving a search request on said virtual server, and outputting the correspondence relation between said first data processing apparatus, said third data processing apparatus and said virtual server in response to said search request.

12. The configuration data management method according to claim 11, further comprising:

said first data processing apparatus transmitting configuration data of said first data processing apparatus to said second data processing apparatus;

said third data processing apparatus transmitting configuration data of said third data processing apparatus to said second data processing apparatus;

said virtual server transmitting configuration data of said virtual server to said second data processing apparatus; and said second data processing apparatus receiving the configuration data of said first data processing apparatus from said first data processing apparatus, receiving the configuration data of said third data processing apparatus from said third data processing apparatus, receiving the configuration data of said virtual server from said virtual server, and outputting the configuration data of said first data processing apparatus, the configuration data of said third data processing apparatus and the configuration data of said virtual server.

13. A non-transitory computer-readable storage medium which stores a configuration data management program to achieve a configuration data management method which comprises:

a first data processing apparatus generating virtual server identification data which uniquely indicates a virtual server in a network system to which said first data processing apparatus belongs, to a virtual server which operates by using resources of said first data processing apparatus, transmitting said virtual server identification data to said virtual server, and transmitting said virtual server identification data to a second data processing apparatus;

said virtual server receiving said virtual server identification data from said first data processing apparatus and transmitting said virtual server identification data to said second data processing apparatus; and said second data processing apparatus receiving said virtual server identification data from said first data processing apparatus, receiving said virtual server identification data from said virtual server, managing a correspondence relation between said first data processing apparatus and said virtual server based on said virtual server identification data, receiving a search request on said virtual server, and outputting the correspondence relation between said first data processing apparatus and said virtual server in response to said search request.

* * * * *